(12) United States Patent
Zhao et al.

(10) Patent No.: US 11,429,191 B2
(45) Date of Patent: Aug. 30, 2022

(54) INPUT METHOD AND SMART TERMINAL DEVICE

(71) Applicant: HUAWEI TECHNOLOGIES CO., LTD., Guangdong (CN)

(72) Inventors: Xinyu Zhao, Dongguan (CN); Yong Zheng, Dongguan (CN); Yunzhe Chen, Shenzhen (CN); Qinghao Jin, Shenzhen (CN); Zeshi Zhang, Shenzhen (CN); Bin Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 16/633,345

(22) PCT Filed: Aug. 31, 2017

(86) PCT No.: PCT/CN2017/099951
§ 371 (c)(1),
(2) Date: Jan. 23, 2020

(87) PCT Pub. No.: WO2019/041238
PCT Pub. Date: Mar. 7, 2019

(65) Prior Publication Data
US 2020/0158816 A1 May 21, 2020

(51) Int. Cl.
*G06F 3/01* (2006.01)
*G06F 3/043* (2006.01)
(Continued)

(52) U.S. Cl.
CPC .............. *G06F 3/017* (2013.01); *G06F 1/163* (2013.01); *G06F 3/011* (2013.01); *G06F 3/042* (2013.01);
(Continued)

(58) Field of Classification Search
CPC .......... G06F 3/017; G06F 1/163; G06F 3/011; G06F 3/042; G06F 3/0433; G06F 3/04812
See application file for complete search history.

(56) References Cited

U.S. PATENT DOCUMENTS

| 8,624,836 B1 | 1/2014 | Miller et al. |
| 2007/0125633 A1* | 6/2007 | Boillot ................... G06F 3/011 361/139 |

(Continued)

FOREIGN PATENT DOCUMENTS

| CN | 102112057 A | 6/2011 |
| CN | 103020604 A | 4/2013 |

(Continued)

OTHER PUBLICATIONS

Office Action dated Dec. 2, 2019, issued in counterpart CN application No. 201780075762.X, with English translation. (9 pages).
(Continued)

*Primary Examiner* — Jonathan A Boyd
(74) *Attorney, Agent, or Firm* — WHDA, LLP

(57) ABSTRACT

An input method and a smart terminal device. After a processor in the smart terminal device determines, based on a first detection solution of a first infrared sensor, that a target object enters or leaves a first space range from a first plane, the processor starts or stops displaying a cursor based on distances measured by ultrasonic sensors; and after the processor determines, based on a second detection result of a second infrared sensor, that the target object enters or leaves a second space range from a second plane, the processor starts or stops performing a confirmation operation based on a location of the cursor.

8 Claims, 12 Drawing Sheets

(51) Int. Cl.
*G06F 3/042* (2006.01)
*G06F 1/16* (2006.01)
*G06F 3/04812* (2022.01)

(52) U.S. Cl.
CPC ........ *G06F 3/0433* (2013.01); *G06F 3/04812* (2013.01)

(56) References Cited

U.S. PATENT DOCUMENTS

| | | | |
|---|---|---|---|
| 2011/0090147 A1* | 4/2011 | Gervais | G06F 3/017 345/157 |
| 2011/0112399 A1 | 5/2011 | Willems et al. | |
| 2012/0280900 A1 | 11/2012 | Wang et al. | |
| 2015/0324000 A1 | 11/2015 | Park et al. | |
| 2017/0205230 A1 | 7/2017 | Send et al. | |
| 2017/0205939 A1 | 7/2017 | Lv | |

FOREIGN PATENT DOCUMENTS

| | | |
|---|---|---|
| CN | 104503576 A | 4/2015 |
| CN | 204965394 U | 1/2016 |
| CN | 105302305 A | 2/2016 |
| CN | 106648102 A | 5/2017 |
| CN | 106662636 A | 5/2017 |
| CN | 106909256 A | 6/2017 |

OTHER PUBLICATIONS

International Search Report dated May 31, 2018, issued in counterpart application No. PCT/CN2017/099951, with English Translation. (15 pages).
Extended (Supplementary) European Search Report dated Jul. 23, 2020, issued in counterpart EP Application No. 17923872.0. (5 pages).
Office Action dated May 27, 2020, issued in counterpart CN Application No. 201780075762.X, with English translation (6 pages).

* cited by examiner

INPUT METHOD AND SMART TERMINAL DEVICE

CROSS-REFERENCE TO RELATED APPLICATIONS

This application is a national stage of International Application No. PCT/CN2017/099951, filed on Aug. 31, 2017, which is hereby incorporated by reference in its entirety.

TECHNICAL FIELD

This application relates to the field of smart terminal device technologies, and in particular, to an input method and a smart terminal device.

BACKGROUND

With development of terminal device technologies, smart terminal devices that support functions such as audio processing, video processing, and data processing are emerging endlessly. Smart terminal devices include, for example, household smart terminals (including an air conditioner, a refrigerator, a rice cooker, a water heater, and the like), commercial smart terminals (including a videophone, a conference desktop smart terminal, and the like), wearable devices (including a smartwatch, smart glasses, and the like), financial smart terminals, smartphones, tablet computers, personal digital assistants (PDA), and computers.

A user may implement control and management on a smart terminal device in a plurality of input manners such as voice input and manual input. However, compared with voice input, manual input has higher privacy and applicability (for example, applicability to a noisy environment).

Because conventional manual input requires a user to perform input on a touch panel of a smart terminal device by using an object such as a finger or a stylus, it is relatively inconvenient for the user to perform input manually when the touch panel is relatively small in area. Therefore, ultrasonic wave based input action identification of a smart terminal device is a development trend of manual input.

In a solution that adopts a technology of ultrasonic wave based input action identification, an ultrasonic sensor integrated in a smart terminal device senses a moving track of a target object (an object such as a finger or a stylus) in a sensing region, and the smart terminal device identifies the moving track to determine input information expected by a user, and finally performs a corresponding operation on the smart terminal device itself based on the input information. The input information includes information such as an input instruction or a track model (such as a sliding-leftward model, an alphabetic model, a digital model, or a Chinese character model).

However, the sensing region of the ultrasonic sensor is a spatial region that an ultrasonic wave emitted by the ultrasonic sensor can reach. Therefore, whenever a target object exists in the sensing region, the smart terminal device identifies that there is input information. As a result, input information obtained by the smart terminal device may not be information that the user expects to enter. An example of such a scenario is that a finger of the user moves in the sensing region while the user does not have an input intention.

Apparently, an effect of an ultrasonic wave based input action identification function of a conventional smart terminal device is relatively poor, and user experience is degraded.

SUMMARY

Embodiments of this application provide an input method and a smart terminal device to improve an effect of an ultrasonic wave based input action identification function of a smart terminal device.

According to a first aspect, an embodiment of this application provides a smart terminal device, where the smart terminal device includes a display panel, at least two ultrasonic sensors, a first infrared sensor, a second infrared sensor, and a processor, where the display panel may display an interface; any one of the at least two ultrasonic sensors may measure a distance between a target object and the ultrasonic sensor; the first infrared sensor may continuously detect whether the target object exists on a first plane, and generate a first detection result; the second infrared sensor may continuously detect whether the target object exists on a second plane, and generate a second detection result, where the first plane is different from the second plane; and when the smart terminal device enables an ultrasonic wave based input action identification function, the processor may perform the following steps:

when determining, based on the first detection result, that the target object enters a specified first space range from the first plane, obtaining the distances measured by the at least two ultrasonic sensors, determining a location of the cursor on the display panel based on the distances measured by the at least two ultrasonic sensors, and controlling the display panel to display the cursor at the location, where the first plane is a border of the first space range;

when determining, based on the second detection result, that the target object enters a specified second space range from the second plane, performing a confirmation operation based on the location of the cursor displayed on the display panel, where the second plane is a border of the second space range and the second space range is contained in the first space range;

when determining, based on the second detection result, that the target object leaves the second space range from the second plane, stopping performing the confirmation operation; and when determining, based on the first detection result, that the target object leaves the first space range from the first plane, stopping displaying the cursor.

According to the foregoing solution, the smart terminal device can determine, based on the detection result of the first infrared sensor, whether a user requires the cursor to be displayed, and determine, based on the detection result of the second infrared sensor, whether the user requires the confirmation operation to be performed. Certainly, the user can also adjust a location of the target object to implement an expected operation on the smart terminal device. Apparently, according to the solution, an effect of an ultrasonic wave based input action identification function of a smart terminal device can be improved, and user experience can be improved.

In a possible design, the first infrared sensor and the second infrared sensor detect, by using infrared light of different wavelengths respectively, whether the target object exists on the respective corresponding planes. This design is used to avoid infrared light interference that is caused when infrared light transmitted by one of the first infrared sensor and the second infrared sensor is received by the other infrared sensor after being reflected by the target object, and improve measurement result accuracy of the first infrared sensor and the second infrared sensor.

In a possible design, when the first infrared sensor can further measure a distance between the target object and the first infrared sensor, the processor may determine the location of the cursor on the display panel based on the distances measured by the at least two ultrasonic sensors and the distance measured by the first infrared sensor. According to this design, the processor can determine a more accurate target distance between the target object and each ultrasonic sensor from a group of distance data measured by the at least two ultrasonic sensors, thereby improving accuracy of the determined location of the cursor.

In a possible design, when the second infrared sensor can further measure a distance between the target object and the second infrared sensor, the processor may determine the location of the cursor on the display panel based on the distances measured by the at least two ultrasonic sensors and the distance measured by the second infrared sensor. According to this design, the processor can determine a more accurate target distance between the target object and each ultrasonic sensor from a group of distance data measured by the at least two ultrasonic sensors, thereby improving accuracy of the determined location of the cursor.

In a possible design, the processor may determine that the target object enters the specified first space range from the first plane, when determining that the last p consecutive first detection results in the first detection result all indicate that the target object exists on the first plane, where p is an integer greater than or equal to 2. According to this design, the processor can accurately determine that the target object enters the specified first space range from the first plane.

In a possible design, the processor may determine that the target object enters the specified second space range from the second plane, when determining that the last q consecutive second detection results in the second detection result all indicate that the target object exists on the second plane, where q is an integer greater than or equal to 2. According to this design, the processor can accurately determine that the target object enters the specified second space range from the second plane.

In a possible design, the processor may further determine that the target object leaves the second space range from the second plane, when determining that the last e second detection results in the second detection result all indicate that the target object does not exist on the second plane and that f second detection results before the last e second detection results all indicate that the target object exists on the second plane, where e and f are both integers greater than or equal to 1. According to this design, the processor can accurately determine that the target object leaves the second space range from the second plane.

In a possible design, the processor may further determine that the target object leaves the first space range from the first plane, when determining that the last g second detection results in the first detection result all indicate that the target object does not exist on the first plane and that k second detection results before the last g second detection results all indicate that the target object exists on the second plane, where g and k are both integers greater than or equal to 1. According to this design, the processor can accurately determine that the target object leaves the first space range from the first plane.

In a possible design, when performing the confirmation operation based on the location of the cursor displayed on the display panel, the processor may use a first manner: when at least one option is displayed on the display panel, selecting a target option at the location of the cursor from the at least one option; or may use a second manner: when the smart terminal device enables a track model based input identification function, recording the location of the cursor.

According to the foregoing method, when an option is displayed on the display panel, the processor may select the target option based on the location of the cursor, and further perform an operation corresponding to the target option. In this case, the user may adjust the location of the cursor by adjusting the location of the target object, thereby selecting the target option expected by the user.

According to the foregoing method, when the smart terminal device enables the track model based input identification function, the processor may generate a moving track of the cursor (or the target object) based on the recorded location of the cursor, and then may match the moving track with a preset track model, so as to identify content (an instruction or a character) of input implemented in this ultrasonic wave based action identification. In this case, the user may adjust the location of the cursor by adjusting the location of the target object, thereby entering the instruction or character expected by the user.

According to a second aspect, an embodiment of this application further provides an input method, where the method is applied to a smart terminal device, the smart terminal device includes a display panel, at least two ultrasonic sensors, a first infrared sensor, a second infrared sensor, and a processor, and the method includes the following steps:

obtaining, by the processor, a first detection result generated by the first infrared sensor and a second detection result generated by the second infrared sensor, where the first infrared sensor is configured to continuously detect whether a target object exists on a first plane, the second infrared sensor is configured to continuously detect whether the target object exists on a second plane, and the first plane is different from the second plane;

when determining, based on the first detection result, that the target object enters a specified first space range from the first plane, obtaining, by the processor, a distance that is measured by each of the at least two ultrasonic sensors and that is between the target object and the ultrasonic sensor, determining a location of the cursor on the display panel based on the distances measured by the at least two ultrasonic sensors, and controlling the display panel to display the cursor at the location, where the first plane is a border of the first space range;

when determining, based on the second detection result, that the target object enters a specified second space range from the second plane, performing, by the processor, a confirmation operation based on the location of the cursor displayed on the display panel, where the second plane is a border of the second space range and the second space range is contained in the first space range;

when determining, based on the second detection result, that the target object leaves the second space range from the second plane, stopping, by the processor, performing the confirmation operation; and when determining, based on the first detection result, that the target object leaves the first space range from the first plane, stopping, by the processor, displaying the cursor.

According to the foregoing solution, the smart terminal device can determine, based on the detection result of the first infrared sensor, whether a user requires the cursor to be displayed, and determine, based on the detection result of the second infrared sensor, whether the user requires the confirmation operation to be performed. Certainly, the user can also adjust a location of the target object to implement an expected operation on the smart terminal device. Apparently, according to the solution, an effect of an ultrasonic wave based input action identification function of a smart terminal device can be improved, and user experience can be improved.

In a possible design, the processor may obtain a distance that is measured by the first infrared sensor and that is between the target object and the first infrared sensor, and then, the processor determines the location of the cursor on the display panel based on the distances measured by the at least two ultrasonic sensors and the distance measured by the first infrared sensor.

In a possible design, the processor may further obtain a distance that is measured by the second infrared sensor and that is between the target object and the second infrared sensor, and then, the processor determines the location of the cursor on the display panel based on the distances measured by the at least two ultrasonic sensors and the distance measured by the second infrared sensor.

In a possible design, when performing the confirmation operation based on the location of the cursor displayed on the display panel, the processor may use a first manner: when at least one option is displayed on the display panel, the processor selects a target option at the location of the cursor from the at least one option; or may use a second manner: when the smart terminal device enables a track model based input identification function, the processor records the location of the cursor.

According to a third aspect, an embodiment of this application provides a processor, applied to a smart terminal device. The processor includes a unit or module that is configured to perform each step in the second aspect.

According to a fourth aspect, this application provides a smart terminal device, including at least one processing element and at least one storage element. The at least one storage element is configured to store a program and data. The at least one processing element is configured to invoke the program and data stored in the storage element, to perform the method provided in the second aspect of this application.

According to a fifth aspect, an embodiment of this application further provides a computer storage medium, where the storage medium stores a software program. When the software program is read and executed by one or more processors, the method provided in any one of the second aspect or the designs of the second aspect can be implemented.

According to a sixth aspect, an embodiment of this application further provides a computer program product including an instruction. When the computer program product runs on a computer, the computer is enabled to perform the methods described in the foregoing aspects.

According to a seventh aspect, an embodiment of this application provides a chip system, where the chip system includes a processor, configured to support a smart terminal device in implementing the functions in the foregoing aspects. In a possible design, the chip system further includes a memory, and the memory is configured to store a program instruction and data that are necessary for the smart terminal device. The chip system may include a chip, or may include a chip and another discrete device.

In the embodiments of this application, the smart terminal device includes the first infrared sensor and the second infrared sensor that respectively detect whether the target object exists on the first plane and the second plane; after the processor in the smart terminal device determines, based on the first detection result of the first infrared sensor, that the target object enters or leaves the first space range from the first plane, the processor starts or stops displaying the cursor based on the distances measured by the ultrasonic sensors; and after the processor determines, based on the second detection result of the second infrared sensor, that the target object enters or leaves the second space range from the second plane, the processor starts or stops performing the confirmation operation based on the location of the cursor. The first plane and the second plane are the borders of the first space range and the second space range, respectively. The first plane is different from the second plane, and the second space range is contained in the first space range. According to the foregoing solution, the smart terminal device can determine, based on the detection result of the first infrared sensor, whether the user requires the cursor to be displayed, and determine, based on the detection result of the second infrared sensor, whether the user requires the confirmation operation to be performed. Certainly, the user can also adjust the location of the target object to implement an expected operation on the smart terminal device. Apparently, according to the solution, an effect of an ultrasonic wave based input action identification function of a smart terminal device can be improved, and user experience can be improved.

DESCRIPTION OF EMBODIMENTS

Figure 1:
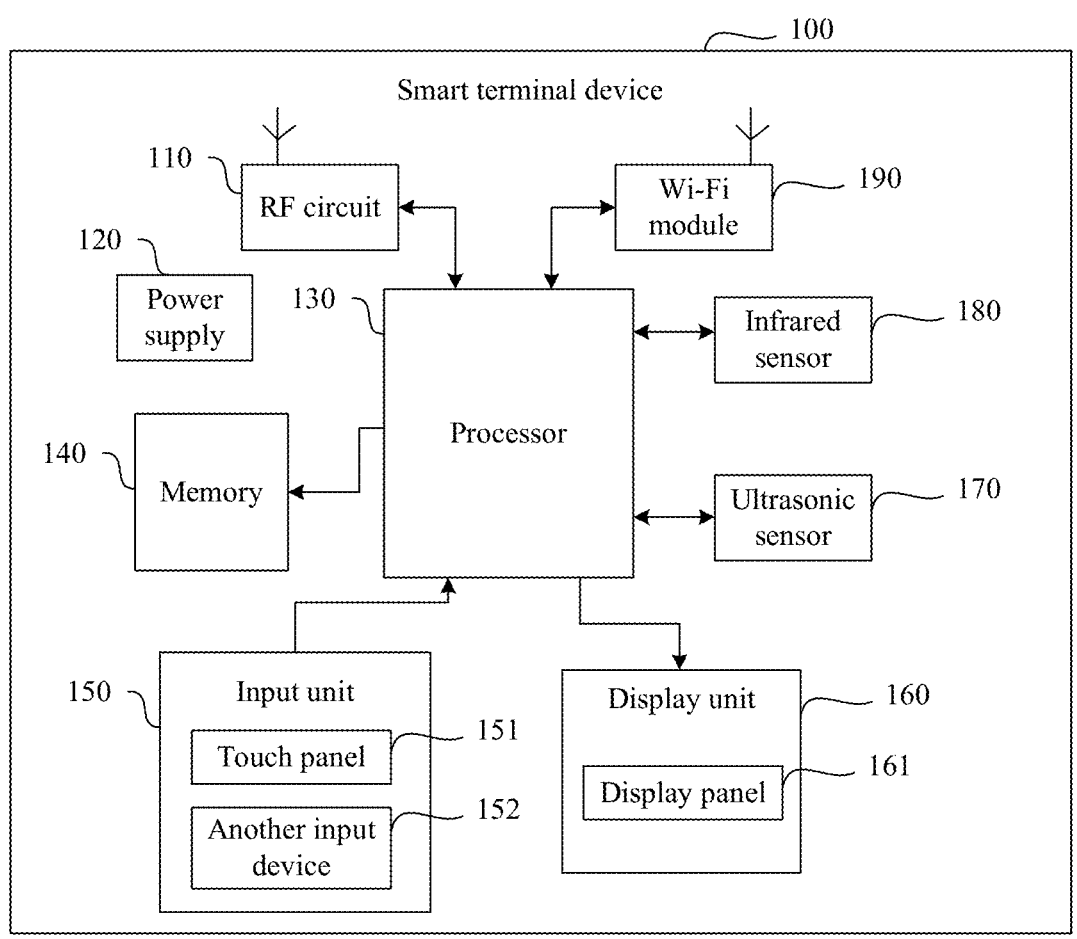
FIG. 1 is a structural diagram of a smart terminal device according to an embodiment of this application.

This application provides an input method and a smart terminal device to improve an effect of an ultrasonic wave based input action identification function of a smart terminal device. The method and the device are based on a same inventive idea. Because problem resolution principles of the method and the device are similar, for implementations of the device and the method, mutual reference may be made, and details are not repeated.

In a solution provided in embodiments of this application, the smart terminal device includes a first infrared sensor and a second infrared sensor that respectively detect whether a target object exists on a first plane and a second plane; after a processor in the smart terminal device determines, based on a first detection result of the first infrared sensor, that the target object enters or leaves a first space range from the first plane, the processor starts or stops displaying a cursor based on distances measured by ultrasonic sensors; and after the processor determines, based on a second detection result of the second infrared sensor, that the target object enters or leaves a second space range from the second plane, the processor starts or stops performing a confirmation operation based on a location of the cursor. The first plane and the second plane are borders of the first space range and the second space range, respectively. The first plane is different from the second plane, and the second space range is contained in the first space range. According to the foregoing solution, the smart terminal device can determine, based on the detection result of the first infrared sensor, whether a user requires the cursor to be displayed, and determine, based on the detection result of the second infrared sensor, whether the user requires the confirmation operation to be performed. Certainly, the user can also adjust a location of the target object to implement an expected operation on the smart terminal device. Apparently, according to the solution, an effect of an ultrasonic wave based input action identification function of a smart terminal device can be improved, and user experience can be improved.

The following describes some terms in this application to facilitate understanding by a person skilled in the art.

(1) A smart terminal device may be, for example, a household smart terminal (including an air conditioner, a refrigerator, a rice cooker, a water heater, or the like), a commercial smart terminal (including a videophone, a conference desktop smart terminal, or the like), a wearable device (including a smartwatch, smart glasses, or the like), a financial smart terminal, a smartphone, a tablet computer, a personal digital assistant (personal digital assistant, PDA), a vehicle-mounted device, or a computer. The smart terminal device not only can implement conventional basic functions of the smart terminal device, but also has functions such as audio processing, video processing, and data processing. The smart terminal device includes a display panel, configured to implement human computer interaction.

(2) A target object is an object that can reflect infrared light and an ultrasonic wave, for example, a human body or a manual input tool such as a stylus commonly used by users.

(3) An infrared sensor is configured to detect whether a target object exists in a corresponding sensing region. The infrared sensor includes an infrared light transmitting element and an infrared light receiving element. The infrared light transmitting element is configured to transmit infrared light. When infrared light comes to the target object, reflection occurs. After reflected infrared light is received by the infrared light receiving element, the infrared sensor generates a detection result indicating that the target object exists in the sensing region; otherwise, if the infrared light receiving element receives no infrared light, the infrared sensor generates a detection result indicating that the target object does not exist in the sensing region.

The sensing region of the infrared sensor is a region that can be reached by infrared light transmitted by the infrared light transmitting element in the infrared sensor.

Optionally, the infrared sensor further includes a filtering cover, and the filtering cover can filter out infrared light whose wavelength does not satisfy a filtering parameter of the filtering cover. Therefore, only infrared light whose wavelength satisfies the filtering parameter can pass through the filtering cover. Therefore, the infrared sensor may filter, by using the filtering cover, infrared light transmitted by the infrared light transmitting element and infrared light reflected to the infrared light receiving element.

Optionally, the infrared sensor further includes a driving chip, configured to calculate a time difference between transmitting infrared light by the infrared transmitting element and receiving infrared light by the infrared light receiving element, or calculate a phase difference between infrared light transmitted by the infrared light transmitting element and infrared light received by the infrared light receiving element, and calculate a distance between the target object and the infrared sensor based on the time difference or the phase difference. Optionally, the driving chip further includes a detection register for storing the detection result generated by the infrared sensor.

(4) An ultrasonic sensor is configured to measure a distance between a target object and the ultrasonic sensor. The ultrasonic sensor includes an ultrasonic wave transmitting element and an ultrasonic wave receiving element. The ultrasonic wave transmitting element is configured to transmit an ultrasonic wave. When the ultrasonic wave comes to the target object, reflection occurs. After a reflected ultrasonic wave is received by the ultrasonic wave receiving element, the ultrasonic sensor may calculate the distance between the target object and the ultrasonic sensor based on the transmitted ultrasonic wave and the received ultrasonic wave.

Because the target object has a specific size and shape and cannot be a point, ultrasonic waves received by the ultrasonic sensor may be reflected from a plurality of locations on the target object. Therefore, the distance that is obtained through calculation by the ultrasonic sensor and that is between the target object and the ultrasonic sensor may be a plurality of distances, and the plurality of distances form a distance data group.

(5) "A plurality of" means two or more than two.

(6) The term "and/or" describes an association relationship between associated objects and indicates that three relationships may exist. For example, A and/or B may represent the following three cases: Only A exists, both A and B exist, and only B exists. The character "/" generally indicates an "or" relationship between associated objects.

In addition, it needs to be understood that the words such as "first" and "second" in descriptions of this application are merely intended for differentiated description, and shall not be understood as an indication or implication of relative importance, or an indication or implication of an order.

The following further describes in detail the embodiments of this application with reference to accompanying drawings.

FIG. 1 is a structural diagram of a possible smart terminal device. Referring to FIG. 1, the smart terminal device 100 includes components such as a radio frequency (RF) circuit 110, a power supply 120, a processor 130, a memory 140, an input unit 150, a display unit 160, an ultrasonic sensor 170, an infrared sensor 180, and a wireless fidelity (Wi-Fi) module 190. It may be understood by a person skilled in the art that, a structure of the smart terminal device shown in FIG. 1 does not constitute any limitation on the smart terminal device. The smart terminal device provided in this embodiment of this application may include more or fewer components than those shown in the figure, or a combination of some components, or components disposed differently.

The following specifically describes each constituent part of the smart terminal device 100 with reference to FIG. 1.

The RF circuit 110 may be configured to receive and send data in a communication or call process. Specifically, after receiving downlink data from a base station, the RF circuit 110 sends the downlink data to the processor 130 for processing, and sends to-be-sent uplink data to the base station. Usually, the RF circuit 110 includes but is not limited to an antenna, at least one amplifier, a transceiver, a coupler, a low noise amplifier (LNA), a duplexer, and the like.

In addition, the RF circuit 110 may further communicate with another device in a wireless manner through a network. The wireless communication may be implemented by using any communications standard or protocol, including but not limited to global system for mobile communications (GSM), general packet radio service (GPRS), code division multiple access (CDMA), wideband code division multiple access (WCDMA), long term evolution (LTE), email, short message service (SMS), and the like.

A Wi-Fi technology belongs to a short-range wireless transmission technology. The smart terminal device 100 may connect to an access point (AP) by using the Wi-Fi module 190, to access a data network. The Wi-Fi module 190 may be configured to receive and send data in a communication process.

Optionally, the smart terminal device 100 may further include a communications interface, configured to physically connect to another device. Optionally, the communications interface is connected to a communications interface of the another device by using a cable, to implement data transmission between the smart terminal device 100 and the another device.

In this embodiment of this application, the smart terminal device 100 needs to have a data transmission function, and therefore, the smart terminal device 100 needs to include a communications module inside the smart terminal device 100. FIG. 1 shows communications modules such as the RF circuit 110 and the Wi-Fi module 190, and the communications interface. However, it may be understood that the smart terminal device 100 has at least one of the foregoing components or another communications module (for example, a Bluetooth module) configured to implement communication, so as to transmit data.

For example, when the smart terminal device 100 is a mobile phone or a wearable device, the smart terminal device 100 may include the RF circuit 110, and may further include the Wi-Fi module 190; when the smart terminal device 100 is a computer, the smart terminal device 100 may include the communications interface, and may further include the Wi-Fi module 190; or when the smart terminal device 100 is a tablet computer, the smart terminal device 100 may include the Wi-Fi module 190.

The memory 140 may be configured to store a software program and a module. The processor 130 runs the software program and module stored in the memory 140, to implement various function applications of the smart terminal device 100 and process data.

Optionally, the memory 140 may mainly include a program storage area and a data storage area. The program storage area may store an operating system, various application programs, and the like. The data storage area may store data created based on use of the smart terminal device, and the like.

In addition, the memory 140 may include a high-speed random access memory, and may further include a non-volatile memory, for example, at least one magnetic disk storage device, a flash memory device, or another volatile solid-state storage device.

The input unit 150 may be configured to receive digital or character information entered by a user, and generate an input signal of a key related to user settings and function control of the smart terminal device 100.

Optionally, the input unit 150 may include a touch panel 151 and another input device 152.

The touch panel 151, also referred to as a touchscreen, can collect a touch operation performed by a user on or near the touch panel 151 (for example, an operation performed by the user on or near the touch panel 151 by using any suitable object or accessory, such as a finger or a stylus), and drive a corresponding connection apparatus according to a preset program. Optionally, the touch panel 151 may include two parts: a touch detection apparatus and a touch controller. The touch detection apparatus detects a location touched by the user, detects a signal brought by a touch operation, and transmits the signal to the touch controller. The touch controller receives touch information from the touch detection apparatus, converts the touch information into touch point coordinates, and sends the touch point coordinates to the processor 130, and can receive and execute a command sent by the processor 130. In addition, the touch panel 151 may be implemented in a plurality of types, such as a resistive type, a capacitive type, an infrared type, and a surface acoustic wave type.

Optionally, the another input device 152 may include but is not limited to one or more of a physical keyboard, a function key (for example, a volume control button or a power button), a trackball, a mouse, a joystick, and the like.

The display unit 160 may be configured to display information entered by the user or information provided for the user, and various menus (options) of the smart terminal device 100. The display unit 160 is a display system of the smart terminal device 100, and is configured to present an interface to implement human computer interaction.

The display unit 160 may include a display panel 161. Optionally, the display panel 161 may be configured in a form such as a liquid crystal display (LCD) or an organic light-emitting diode (OLED).

Further, the touch panel 151 may cover the display panel 161. After detecting a touch operation on or near the touch panel 151, the touch panel 151 transmits information about the touch operation to the processor 130 to determine a touch event type. Then the processor 130 provides corresponding visual output on the display panel 161 based on the touch event type.

Although in FIG. 1, the touch panel 151 and the display panel 161 serve as two independent components to implement input and output functions of the smart terminal device 100, in some embodiments, the touch panel 151 and the display panel 161 may be integrated to implement the input and output functions of the smart terminal device 100.

The processor 130 is a control center of the smart terminal device 100. The processor 130 uses various interfaces and lines to connect to the components, and implements various functions of the smart terminal device 100 and data processing by running or executing the software program and/or module stored in the memory 140 and by invoking the data stored in the memory 140, so as to implement a plurality of services that are based on the smart terminal device.

Optionally, the processor 130 may include one or more processing units. Optionally, the processor 130 may integrate an application processor and a modem processor, where the application processor mainly processes an operating system, a user interface, an application program, and the like, and the modem processor mainly processes wireless communication. It may be understood that the modem processor may alternatively not be integrated into the processor 130.

The ultrasonic sensor 170 is configured to measure a distance between a target object and the ultrasonic sensor 170 in a sensing region of the ultrasonic sensor 170 when the smart terminal device 100 enables an ultrasonic wave based input action identification function. Optionally, there may be at least two ultrasonic sensors 170. The processor 130 may display a cursor on the display panel 161 based on the distance measured by the ultrasonic sensor 170, and perform a confirmation operation based on a location of the cursor.

The infrared sensor 180 is configured to detect whether the target object exists in the sensing region. Then, based on a detection result of the infrared sensor 180, the processor 130 may start or stop displaying the cursor and start or stop performing the confirmation operation.

The smart terminal device 100 further includes the power supply 120 (such as a battery) configured to supply power to each component. Optionally, the power supply 120 may be logically connected to the processor 130 by using a power management system, so as to implement functions such as charge management, discharge management, and power consumption management by using the power management system.

Although not shown, the smart terminal device 100 may further include another type of sensor, an audio circuit, a camera, and other components. Details are not described herein.

Figure 2:
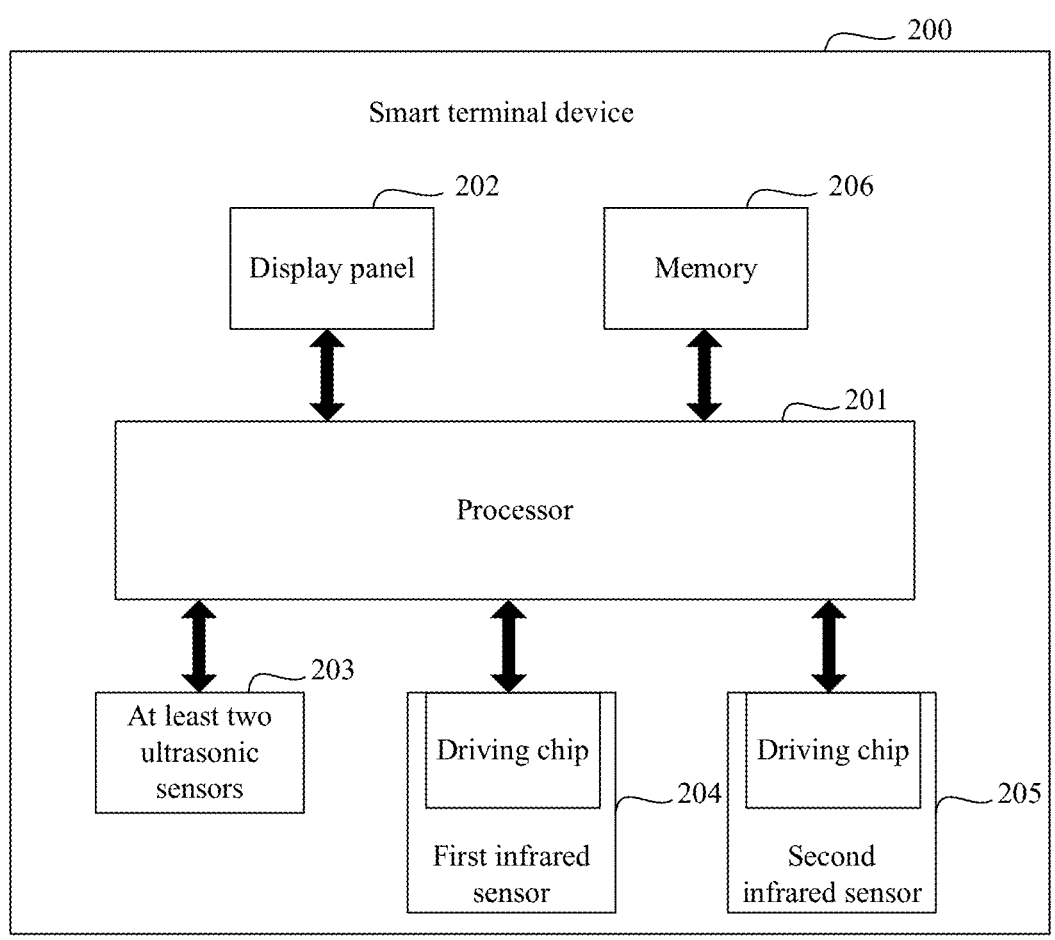
FIG. 2 is a structural diagram of another smart terminal device according to an embodiment of this application.

An embodiment of this application further provides a smart terminal device. Referring to FIG. 2, the smart terminal device 200 includes a processor 201, a display panel 202, at least two ultrasonic sensors 203, a first infrared sensor 204, and a second infrared sensor 205. The display panel 202, the at least two ultrasonic sensors 203, the first infrared sensor 204, and the second infrared sensor 205 are all connected to the processor 201.

Optionally, any one of the first infrared sensor 204, the second infrared sensor 205, and the at least two ultrasonic sensors 203 may be connected to the processor 201 through an inter-integrated circuit (I2C) bus or another communications interface bus.

Optionally, the first infrared sensor 204 and/or the second infrared sensor 205 may be connected to the processor 201 by using respective driving chips, as shown in FIG. 2.

Each of the at least two ultrasonic sensors 203 is configured to measure a distance between a target object and the ultrasonic sensor 203.

Conventionally, to help the processor 201 accurately determine a location (such as coordinate information) of a cursor on the display panel 202 subsequently based on the distances measured by the ultrasonic sensors 203, the ultrasonic sensor 203 may measure distances between the target object and the ultrasonic sensor 203 in different directions. However, usually, one ultrasonic sensor 203 measures a distance between the target object and the ultrasonic sensor 203 in a specified direction. Therefore, in this embodiment of this application, the smart terminal device 200 includes the at least two ultrasonic sensors 203, and any two of the at least two ultrasonic sensors 203 perform measurement in different directions.

Figure 3:
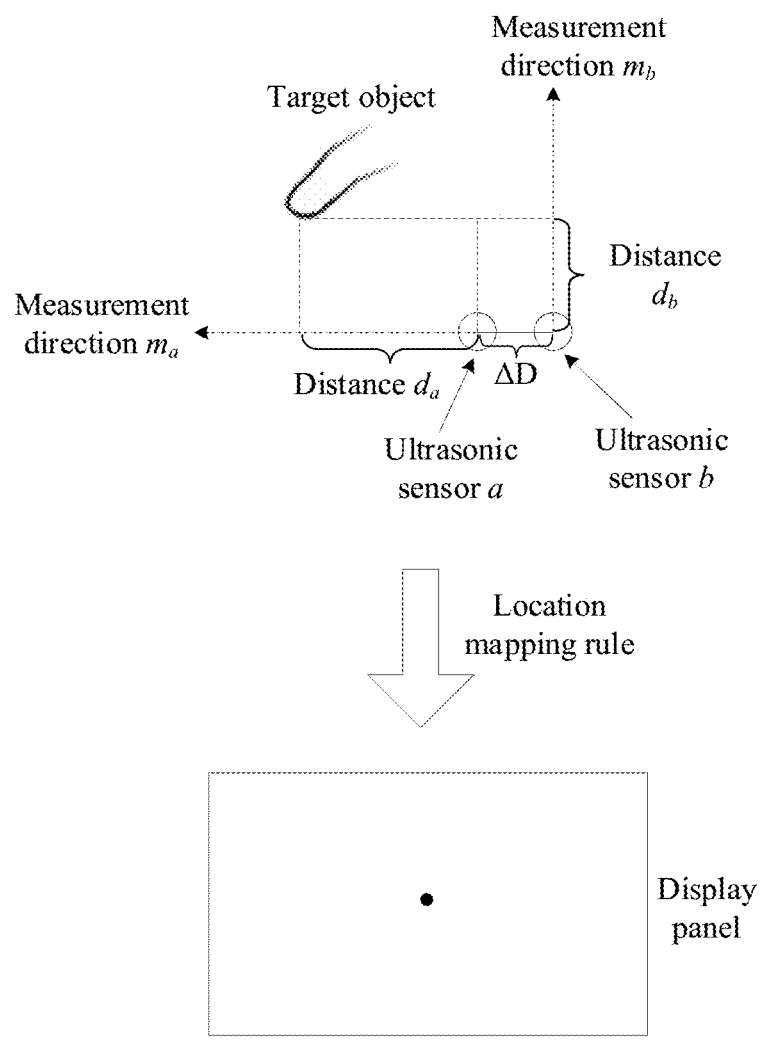
FIG. 3 is an example diagram of location mapping according to an embodiment of this application.

For example, as shown in FIG. 3, the smart terminal device 200 includes two ultrasonic sensors 203 (an ultrasonic sensor a and an ultrasonic sensor b), and a measurement direction $m_a$ of the ultrasonic sensor a is perpendicular to a measurement direction $m_b$ of the ultrasonic sensor b. The processor 201 may set up a coordinate system based on the direction $m_a$, the direction $m_b$, and a preset origin (for example, a location of the ultrasonic sensor a, a location of the ultrasonic sensor b, or another location). Then, the processor 201 may determine a location of the target object in the coordinate system based on a distance $d_a$ that is measured by the ultrasonic sensor a and that is between the target object and the ultrasonic sensor a in the direction $m_a$, and a distance $d_b$ that is measured by the ultrasonic sensor b and that is between the target object and the ultrasonic sensor b in the direction $m_b$. After obtaining the location of the target object in the coordinate system, the processor 201 may map, according to a preset location mapping rule, the location of the target object in the coordinate system to a corresponding location on the display panel 202, for example, a location of a black spot on a display panel in FIG. 3.

Optionally, in the example shown in FIG. 3, the processor 201 may further consider a distance ΔD between the ultrasonic sensor a and the ultrasonic sensor b when determining the location of the target object in the coordinate system. Optionally, when the distance between the ultrasonic sensor a and the ultrasonic sensor b is less than a specified value, the processor 201 may alternatively ignore ΔD.

It should be noted that FIG. 3 shows only an example of a location mapping method and does not constitute any limitation on this embodiment of this application. In an actual application, the smart terminal device 200 may include three or more ultrasonic sensors 203, and an included angle between measurement directions of any two ultrasonic sensors 203 may alternatively not be 90 degrees. Correspondingly, the processor 201 also needs to set up a coordinate system based on measurement directions of the ultrasonic sensors 203 in the smart terminal device 200. Details are not described in this embodiment of this application again. In addition, the location mapping rule used by the processor 201 may be determined by using a plurality of conventional mapping algorithms.

Figure 4:
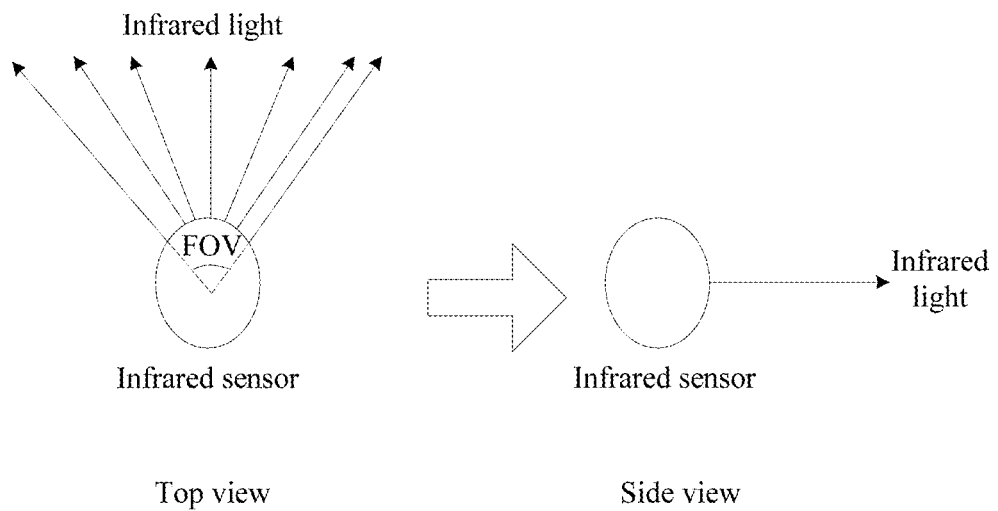
FIG. 4 is a schematic diagram of transmitting infrared light by an infrared sensor according to an embodiment of this application.

In this embodiment of this application, each of the first infrared sensor 204 and the second infrared sensor 205 may transmit infrared light on a corresponding plane, as shown in FIG. 4. The infrared light transmitted by the infrared sensor may form a specified field of view (FOV) on the corresponding plane. Therefore, the first infrared sensor 204 may detect, by using infrared light transmitted on a corresponding first plane, whether the target object exists on the first plane; and the second infrared sensor 205 may also detect, by using infrared light transmitted on a corresponding second plane, whether the target object exists on the second plane.

To avoid a problem that measurement result accuracy of the infrared sensor that receives infrared light is reduced because infrared light transmitted by one of the first infrared sensor 204 and the second infrared light 205 is received by the other infrared sensor after being reflected by the target object, in this embodiment of this application, the first infrared sensor 204 and the second infrared sensor 205 use infrared light of different wavelengths to detect whether the target object exists on the corresponding planes.

Therefore, to improve measurement result accuracy of the first infrared sensor 204 and the second infrared sensor 205, the first infrared sensor 204 is specifically configured to detect, by using infrared light of a first wavelength, whether the target object exists on the first plane, and the second infrared sensor 205 is specifically configured to detect, by using infrared light of a second wavelength, whether the target object exists on the second plane, where the first wavelength is different from the second wavelength, and the first plane may be parallel with the second plane.

To allow the first infrared sensor 204 and the second infrared sensor 205 to detect, by using infrared light of different wavelengths, whether the target object exists on the corresponding planes, the following implementations may be used in this embodiment of this application:

In a first implementation, an infrared light transmitting element in the first infrared sensor 204 is of a same type as an infrared light transmitting element in the second infrared sensor 205, and an infrared light receiving element in the first infrared sensor 204 is also of a same type as an infrared light receiving element in the second infrared sensor 205, but a filtering parameter of a filtering cover in the first infrared sensor 204 is different from a filtering parameter of a filtering cover in the second infrared sensor 205.

Figure 4A:
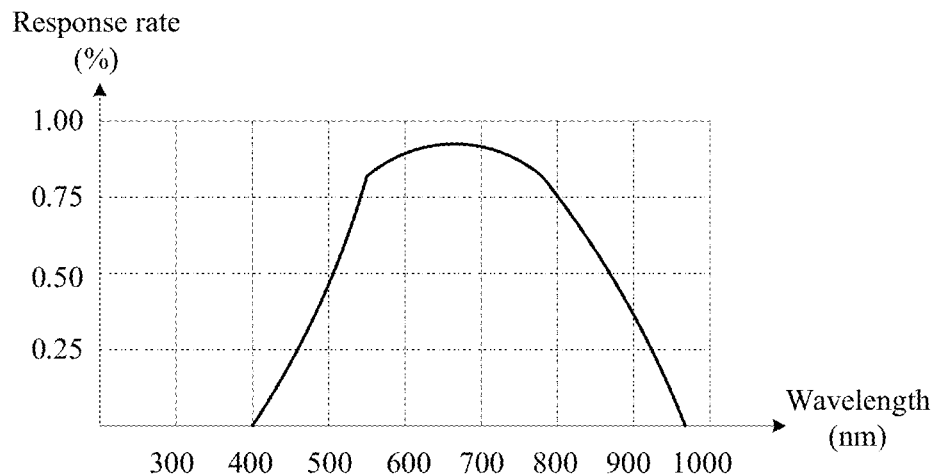
FIG. 4A is a first schematic diagram of a correspondence between a response rate and an infrared light wavelength according to an embodiment of this application.
Figure 4B:
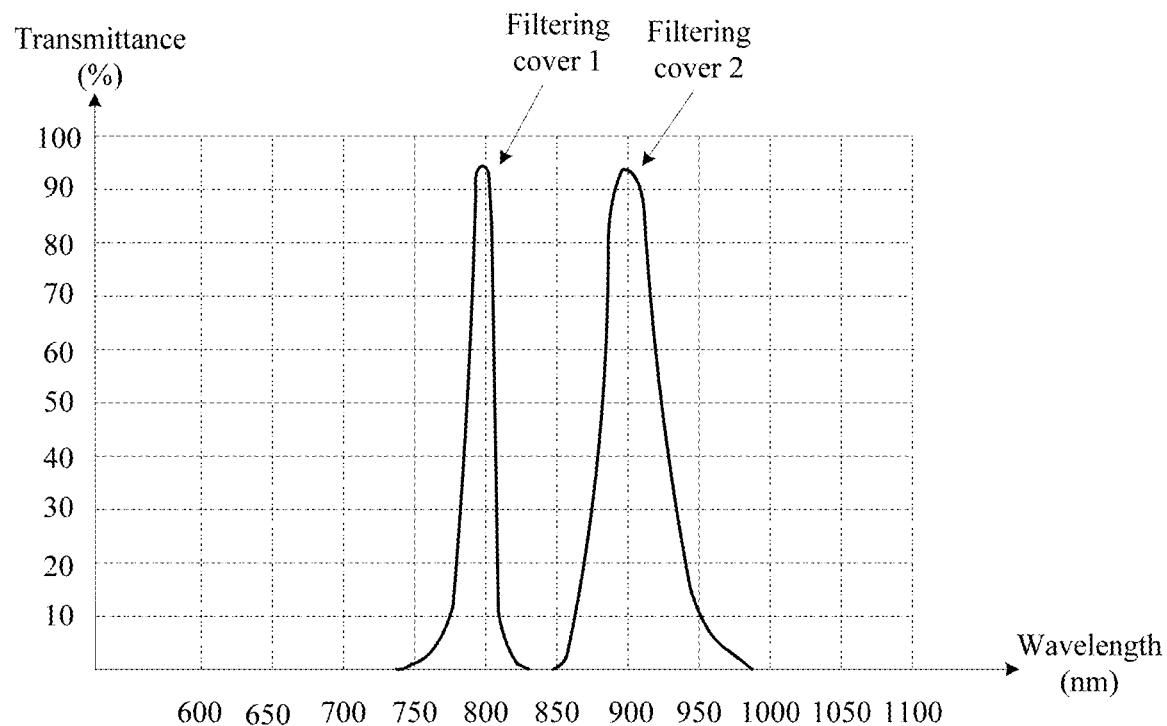
FIG. 4B is a first schematic diagram of a correspondence between transmittance and an infrared light wavelength according to an embodiment of this application.

For example, FIG. 4A shows a correspondence between a response rate of the infrared light transmitting elements in the first infrared sensor 204 and the second infrared sensor 205 and an infrared light wavelength, and a correspondence between a response rate of the infrared light receiving elements in the first infrared sensor 204 and the second infrared sensor 205 and an infrared light wavelength. FIG. 4B shows a correspondence between transmittance of a filtering cover 1 in the first infrared sensor 204 and an infrared light wavelength, and a correspondence between transmittance of a filtering cover 2 in the second infrared sensor 205 and an infrared light wavelength. It can be learned from FIG. 4A and FIG. 4B that the first wavelength is 750-820 nanometers (nm) and the second wavelength is 850-985 nm.

In the first implementation, the infrared light transmitting element in the first infrared sensor 204 and the infrared light transmitting element in the second infrared sensor 205 can transmit infrared light of a same wavelength; both the infrared light receiving element in the first infrared sensor 204 and the infrared light receiving element in the second infrared sensor 205 can receive infrared light of all wavelengths; and a wavelength of infrared light that can penetrate the filtering cover in the first infrared sensor 204 is different from a wavelength of infrared light that can penetrate the filtering cover in the second infrared sensor 205. Therefore, the infrared light of the first wavelength can penetrate the filtering cover in the first infrared sensor 204, and the infrared light of the second wavelength can penetrate the filtering cover in the second infrared sensor 205.

In a second implementation, an infrared light transmitting element in the first infrared sensor 204 is of a different type from an infrared light transmitting element in the second infrared sensor 205, and an infrared light receiving element in the first infrared sensor 204 is also of a different type from an infrared light receiving element in the second infrared sensor 205, but a filtering parameter of a filtering cover in the first infrared sensor 204 is the same as a filtering parameter of a filtering cover in the second infrared sensor 205.

Figure 4C:
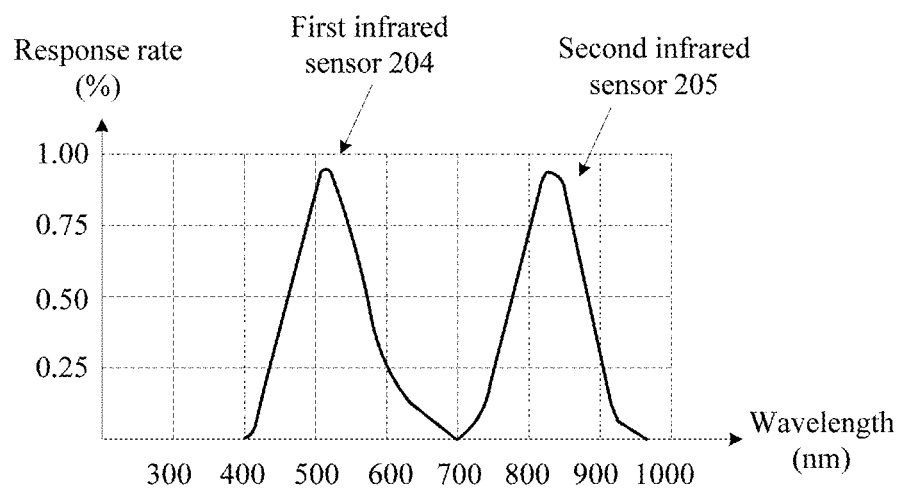
FIG. 4C is a second schematic diagram of a correspondence between a response rate and an infrared light wavelength according to an embodiment of this application.
Figure 4D:
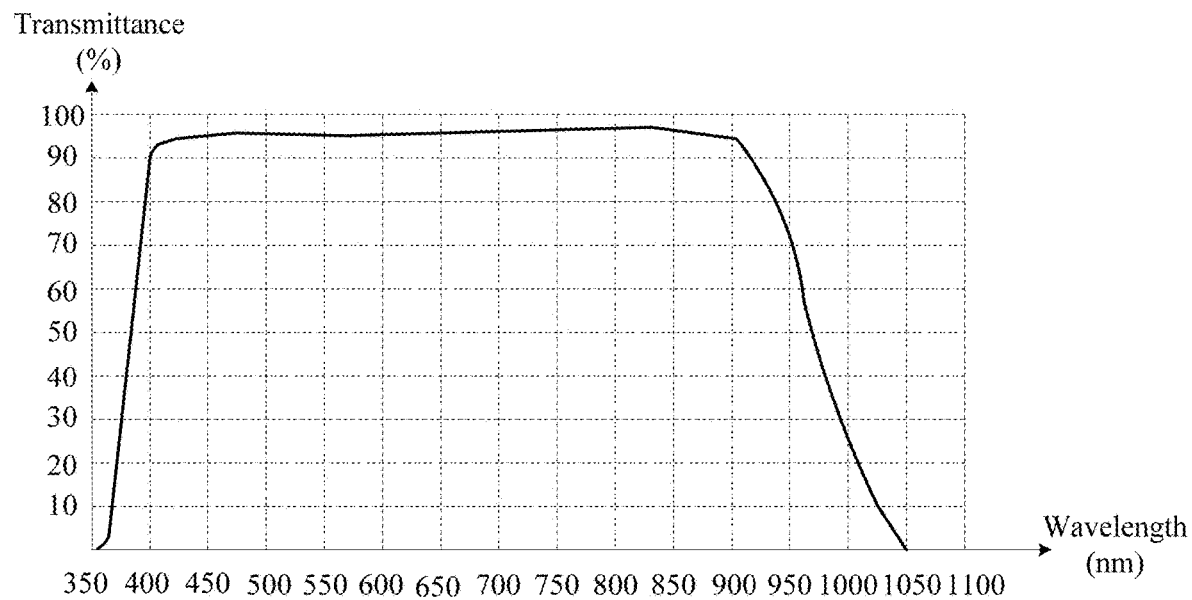
FIG. 4D is a second schematic diagram of a correspondence between transmittance and an infrared light wavelength according to an embodiment of this application.

For example, FIG. 4C shows a correspondence between a response rate of the infrared light transmitting element in the first infrared sensor 204 and an infrared light wavelength, a correspondence between a response rate of the infrared light receiving element in the first infrared sensor 204 and an infrared light wavelength, a correspondence between a response rate of the infrared light transmitting element in the second infrared sensor 205 and an infrared light wavelength, and a correspondence between a response rate of the infrared light receiving element in the second infrared sensor 205 and an infrared light wavelength. FIG. 4D shows a correspondence between transmittance of the filtering covers in the first infrared sensor 204 and the second infrared sensor 205 and an infrared light wavelength. It can be learned from FIG. 4C and FIG. 4D that the first wavelength is 400-700 nm and the second wavelength is 700-950 nm.

In the second implementation, the infrared light transmitting element in the first infrared sensor 204 can transmit the infrared light of the first wavelength, and the infrared light transmitting element in the second infrared sensor 205 can transmit the infrared light of the second wavelength; the infrared light receiving element in the first infrared sensor 204 receives the infrared light of the first wavelength, and the infrared light receiving element in the second infrared sensor 205 receives the infrared light of the second wavelength; and infrared light of all wavelengths can penetrate the filtering covers in the first infrared sensor 204 and the second infrared sensor 205.

According to the foregoing implementations, the first infrared sensor 204 and the second infrared sensor 205 in the smart terminal device 200 can detect, by using infrared light of different wavelengths, whether the target object exists on the corresponding planes, thereby improving the measurement result accuracy of the first infrared sensor 204 and the second infrared sensor 205.

Figure 5:
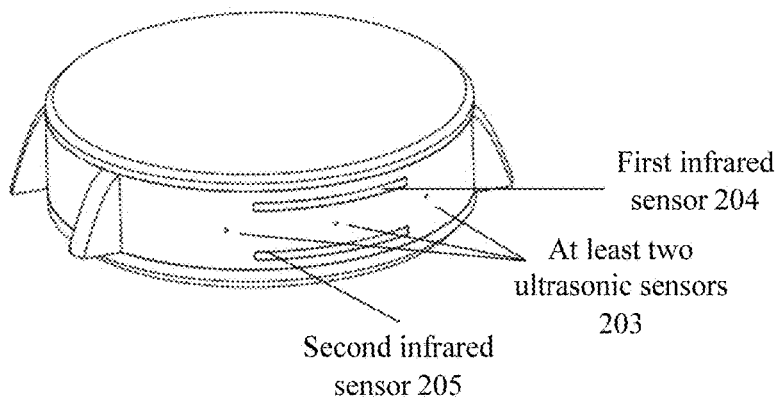
FIG. 5 is a first example diagram of installation locations of all sensors on a smartwatch according to an embodiment of this application.

Optionally, it should be noted that, to ensure that the first infrared sensor 204, the second infrared sensor 205, and the at least two ultrasonic sensors 203 can detect the target object simultaneously, all the sensors need to be concentratively embedded into a housing of the smart terminal device 200. Certainly, installation locations of all the sensors in the smart terminal device 200 may be determined based on the following factors: not affecting basic functions of the smart terminal device 200, ease of operating the target object by a user, aesthetics, and the like. For example, if the smart terminal device 200 may be placed on a desk or worn on the user, the sensors may be concentratively embedded into a side of the smart terminal device 200. The following provides descriptions by using only an example in which the smart terminal device 200 is a smartwatch, but the smartwatch does not constitute any limitation on the smart terminal device 200. As shown in FIG. 5, all the sensors may be embedded into a side of a watchcase of the smartwatch.

Figure 5A:
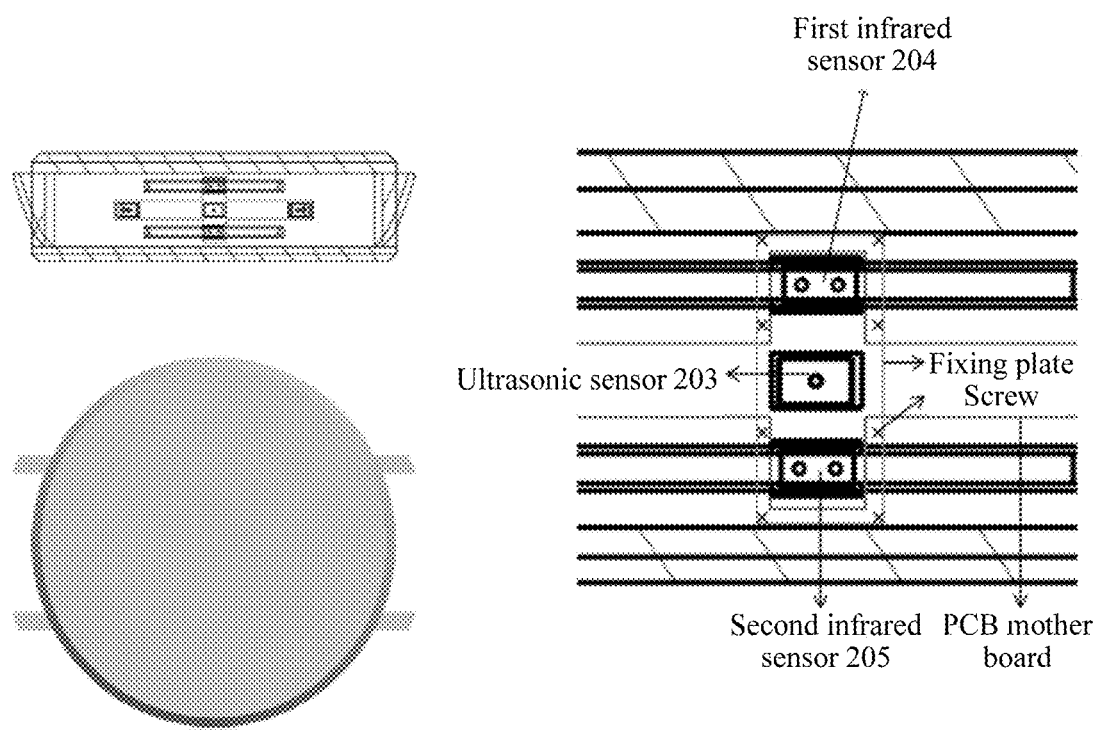
FIG. 5A is a second example diagram of installation locations of all sensors on a smartwatch according to an embodiment of this application.
Figure 5B:
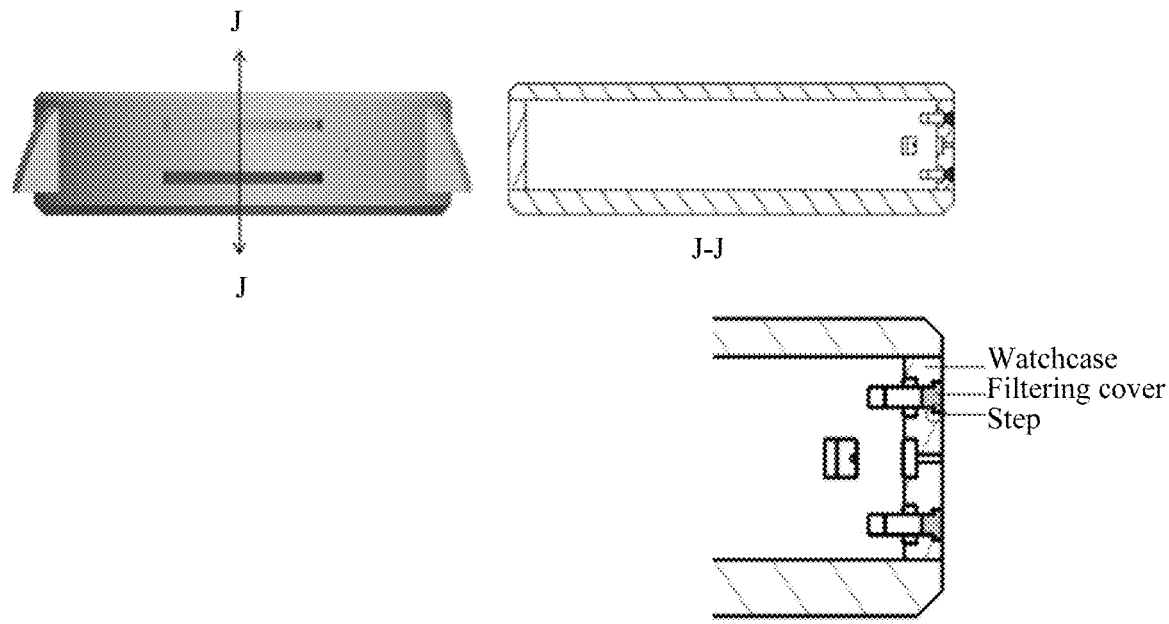
FIG. 5B is a third example diagram of installation locations of all sensors on a smartwatch according to an embodiment of this application.

Optionally, the first infrared sensor 204, the second infrared sensor 205, and the at least two ultrasonic sensors 203 may be connected to a printed circuit board (PCB) mother board of the smartwatch by using a flexible material. In addition, there is a fixing plate behind the PCB mother board. The fixing plate secures the first infrared sensor 204, the second infrared sensor 205, and the at least two ultrasonic sensors 203 to the watchcase by using screws, as shown in FIG. 5A. Moreover, the filtering covers of the first infrared sensor 204 and the second infrared sensor 205 are glued to a body of the watch and are limited in position by steps of the filtering covers, as shown in FIG. 5B.

Figure 6:
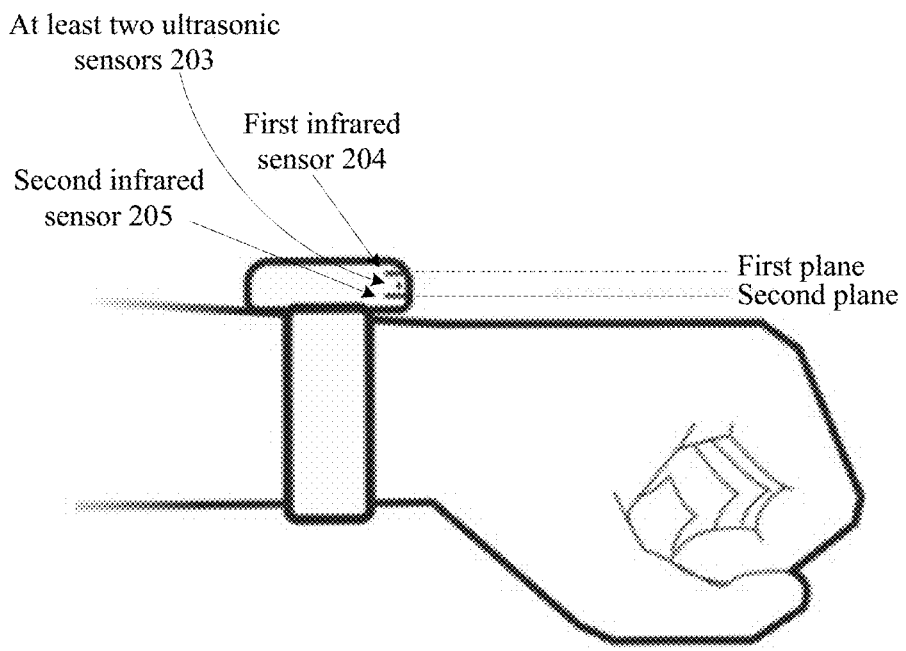
FIG. 6 is a schematic diagram of a location relationship between a first plane and a second plane according to an embodiment of this application.
Figure 7:
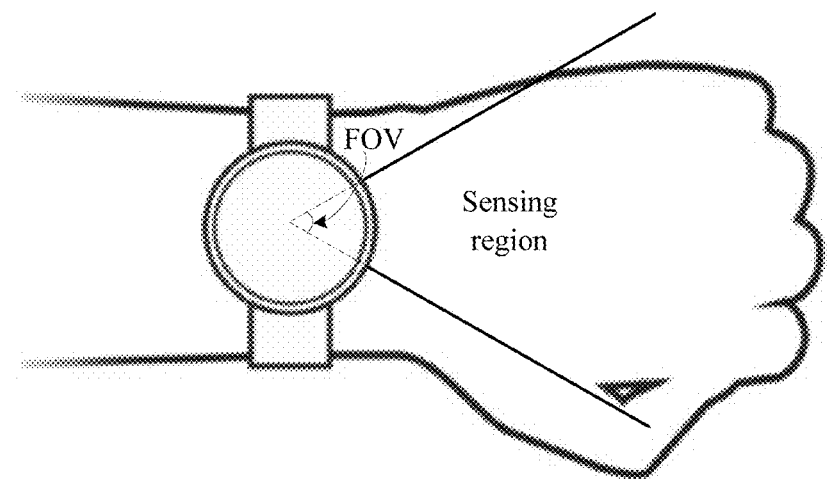
FIG. 7 is a schematic diagram of a sensing region of an infrared sensor according to an embodiment of this application.

Based on the installation locations of all the sensors on the smartwatch shown in FIG. 5, when the smartwatch is worn on the user, a location relationship between the first plane and the second plane is shown in FIG. 6. Optionally, to ensure that the user can observe an operation result on the display panel 202 while operating the target object, thereby improving user experience, the first plane and the second plane are both parallel with the display panel 202. FIG. 7 shows a top view of a sensing region of the first infrared sensor 204 on the first plane (a region that can be reached by infrared light transmitted by the first infrared sensor 204) or a sensing region of the second infrared sensor 205 on the second plane.

Certainly, in a scenario in which the smart terminal device 200 is another type of device, the first plane and the second plane may form a specific angle with the display panel 202. This is not limited in this embodiment of this application.

In a scenario in which the smart terminal device 200 enables an ultrasonic wave based input action identification function, the first infrared sensor 204 is configured to continuously detect whether the target object exists on the first plane (namely, in the sensing region of the first infrared sensor 204), and generate a first detection result; and the second infrared sensor 205 is configured to continuously detect whether the target object exists on the second plane (namely, in the sensing region of the second infrared sensor 205), and generate a second detection result, where the first plane and the second plane may be different planes.

Optionally, the first infrared sensor 204 and/or the second infrared sensor 204 may detect, consecutively for a plurality of times (for example, in a plurality of periods), whether the target object exists in the corresponding sensing region (regions).

The first infrared sensor 204 generates a first detection result after each time of detection. Optionally, the first detection result is used to indicate whether the target object exists on the first plane. For example, when the first detection result is "1", it indicates that the first infrared sensor 204 detects the target object on the first plane (that is, the target object exists on the first plane); when the first detection result is "0", it indicates that the first infrared sensor 204 does not detect the target object on the first plane (that is, the target object does not exist on the first plane).

The second detection result generated by the second infrared sensor 205 may be similar to the first detection result generated by the first infrared sensor 204. Details are not described herein again.

Optionally, the first infrared sensor 204 may notify the processor 201 of the generated first detection result in the following manners:

Manner 1: If there is no detection register in a driving chip of the first infrared sensor 204, the driving chip proactively sends the generated first detection result to the processor 201 after generating the first detection result.

Manner 2: If there is a detection register in a driving chip of the first infrared sensor 204, the driving chip stores the first detection result in the detection register after generating the first detection result, and the processor 201 may read the first detection result from the detection register based on a requirement.

Similar to the first infrared sensor 204, the second infrared sensor 205 may also notify the processor 201 of the generated second detection result in either of the foregoing manners.

To further decrease power consumption, when the processor 201 determines that a specified threshold quantity (for example, 20 or 50) of the last consecutive first detection results all indicate that the target object does not exist on the first plane, the processor 201 may start to enter a sleep state and suspend the ultrasonic wave based input action identification function.

After detecting, for a specified quantity of consecutive times, that the target object does not exist on the first plane, the first infrared sensor 204 may wake up the processor 201 in an interruption manner when generating, for the first time, a first detection result indicating that the target object exists on the first plane.

The processor 201 may also periodically poll the detection register of the first infrared sensor 204 after suspending the ultrasonic wave based input action identification function. When determining that the last first detection result in the detection register indicates that the target object exists on the first plane, the processor 201 enables the ultrasonic wave based input action identification function.

The processor 201 may also suspend or enable the ultrasonic wave based input action identification function based on the second detection result of the second infrared sensor 205. A specific process is similar to the foregoing process, and details are not described herein again.

After the processor 201 enables the ultrasonic wave based input action identification function, the processor 201 may perform the following steps based on the first detection result or the second detection result.

Step A: When determining, based on the first detection result, that the target object enters a specified first space range from the first plane, the processor 201 obtains the distances measured by the at least two ultrasonic sensors 203, determines the location of the cursor on the display panel 202 based on the distances measured by the at least two ultrasonic sensors 203, and controls the display panel 202 to display the cursor at the location, where the first plane is a border of the first space range.

Because the first detection result is obtained by the first infrared sensor 204 through a plurality of consecutive times of detection, there are a plurality of first detection results. The processor 201 may determine that the target object enters the specified first space range from the first plane, when determining that the last p consecutive first detection results in the first detection result all indicate that the target object exists on the first plane, where p is an integer greater than or equal to 2.

The first space range is contained in a sensing range of the at least two ultrasonic sensors 203. To improve user experience, another border of the first space range is a plane that the target object can touch. The following continues to use the example in which the smart terminal device 200 is a smartwatch. As shown in FIG. 6, the borders of the first space range are the second plane and hand skin of the user. In this way, the user can move the target object when the target object is in contact with the hand skin. This helps the user operate the target object more easily.

Figure 8:
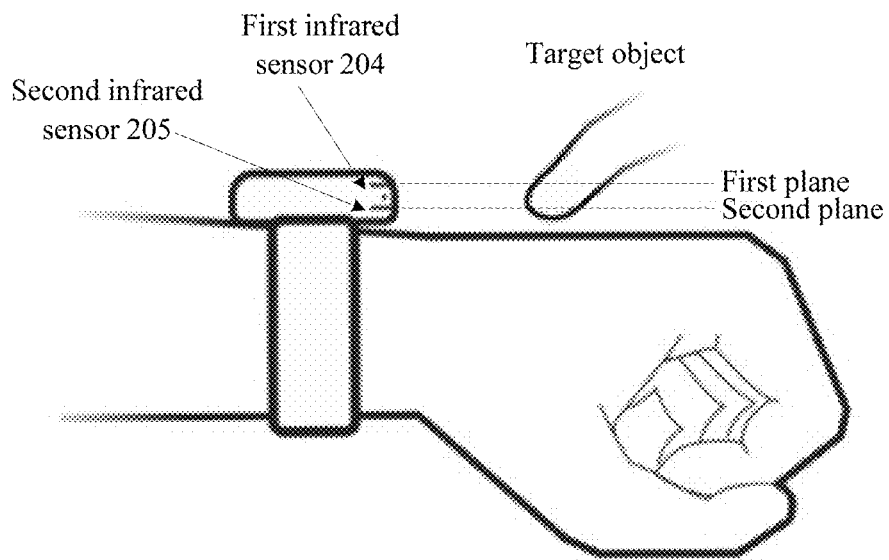
FIG. 8 is a schematic diagram of location relationships between a target object and a first plane and between the target object and a second plane according to an embodiment of this application.

Because the target object is of a specific volume, when the user operates a top of the target object to enter the first space range, another part of the target object is still on the first plane, as shown in FIG. 8. Therefore, the first infrared sensor 204 detects the target object on the first plane for at least two consecutive times (namely p times).

Figure 9:
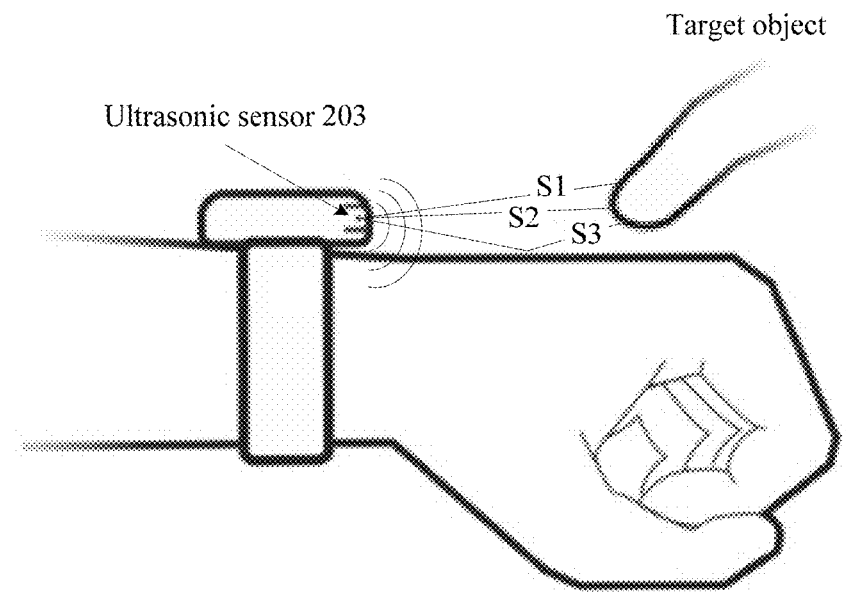
FIG. 9 is a schematic diagram of a group of distance data measured by an ultrasonic sensor according to an embodiment of this application.

It can be learned from the foregoing function descriptions of the ultrasonic sensor 203 that distances that are measured by each ultrasonic sensor 203 and that are between the target object and the ultrasonic sensor 203 may form a distance data group. As shown in FIG. 9, the group of distance data measured by the ultrasonic sensor 203 in the figure is [S1, S2, S3].

Therefore, before determining a location of the target object in a target coordinate system, the processor 203 further needs to determine a target distance between the target object and each ultrasonic sensor 203 based on the group of distance data measured by the ultrasonic sensor 203. The target coordinate system is set up based on measurement directions of the at least two ultrasonic sensors 203 and a specified origin.

The processor 201 may determine, based on a group of distance data measured by an ultrasonic sensor 203, a target distance between the target object and the ultrasonic sensor 203 by using but not limited to the following methods:

Method 1: The processor 201 calculates an average value of distances included in the distance data group and uses the average value as the target distance.

Method 2: The processor 201 selects a distance with a smallest value from the distance data group and uses the selected distance as the target distance.

When the first infrared sensor 204 further has a measurement function and can measure a distance between the target object and the first infrared sensor 204, the processor 201 may specifically determine the location of the cursor on the display panel 202 based on the distances measured by the at least two ultrasonic sensors 203 and the distance measured by the first infrared sensor 204.

The first infrared sensor 204 is relatively close to the at least two ultrasonic sensors 203. Therefore, when the first infrared sensor 204 also has the distance measurement function, to improve accuracy of the target distance that is determined by the processor 201 and that is between the target object and each ultrasonic sensor 203, optionally, the processor 201 may determine the target distance between the target object and each ultrasonic sensor 203 by using the distance that is measured by the first infrared sensor 204 and that is between the target object and the first infrared sensor 204, and the group of distance data measured by each ultrasonic sensor 203. That is, a difference between an actual distance between the target object and the at least two ultrasonic sensors 203 and the distance measured by the first infrared sensor 204 is less than a specified error threshold, where the actual distance is determined based on the target distance that is determined by the processor 201 and that is between the target object and each ultrasonic sensor 203.

Figure 10:
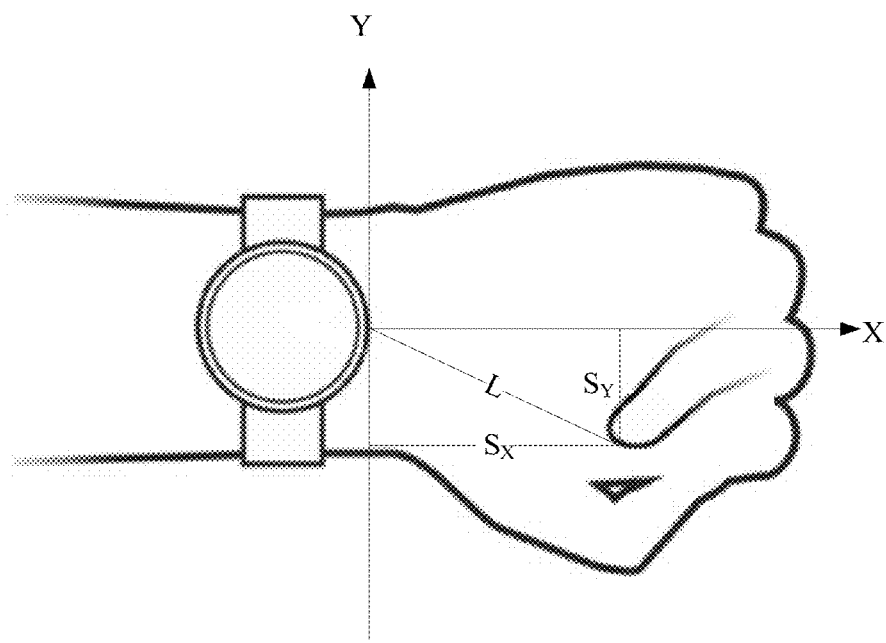
FIG. 10 is a schematic diagram of determining a target distance between a target object and each ultrasonic sensor according to an embodiment of this application.

For example, if the smartwatch includes two ultrasonic sensors 203 and measurement directions of the two ultrasonic sensors 203 are perpendicular to each other, a coordinate system determined based on the measurement directions and a specified origin is shown in FIG. 10. The origin is a point determined by abstracting locations of the two ultrasonic sensors 203 and the first infrared sensor 204. Assuming that a group X of distance data measured by an ultrasonic sensor 203 whose measurement direction is along an X axis is $[S_X1, S_X2, \ldots, S_Xm]$, a group Y of distance data measured by an ultrasonic sensor 203 whose measurement direction is along a Y axis is $[S_Y1, S_Y2, \ldots, S_Yn]$, and the distance that is measured by the first infrared sensor 204 and that is between the target object and the first infrared sensor 204 on the first plane is L, where m and n are integers greater than or equal to 2. In this case, a target distance $S_X i$ determined by the processor from the distance data group X and a target distance $S_Y j$ determined from the distance data group Y may satisfy but not limited to the following formula:

$$\sqrt{S_{Xi_2}+S_{Yj}^2} \approx L$$

where i is an integer greater than 0 and less than or equal to m, and j is an integer greater than 0 and less than or equal to n.

Optionally, when the second infrared sensor 205 further has a measurement function and can measure a distance between the target object and the second infrared sensor 205, the processor 201 may also determine the location of the cursor on the display panel 202 based on the distances measured by the at least two ultrasonic sensors 203 and the distance measured by the second infrared sensor 205. A specific process is similar to the foregoing process in which the processor 201 determines the location of the cursor on the display panel 202 based on the distance measured by the first infrared sensor 204, and details are not described herein again.

After determining the target distance between the target object and each ultrasonic sensor 203, the processor 201 determines the location of the target object in the target coordinate system, and may map the location of the target object in the target coordinate system to a corresponding location on the display panel 202 according to a preset location mapping rule, to determine the location of the cursor on the display panel 202. Then the processor 201 may display the cursor at the determined location on the display panel 202.

Step B: When determining, based on the second detection result, that the target object enters a specified second space range from the second plane, the processor 201 performs a confirmation operation based on the location of the cursor displayed on the display panel 202, where the second plane is a border of the second space range and the second space range is contained in the first space range.

Because the second space range is contained in the first space range and the first plane and the second plane are respectively the borders of the first space range and the second space range, the target object needs to enter the first space range before entering the second space range.

There may be a plurality of second detection results. The processor 201 may determine that the target object enters the specified second space range from the second plane, when determining that the last q consecutive second detection results in the plurality of the second detection results all indicate that the target object exists on the second plane, where q is an integer greater than or equal to 2.

Optionally, when performing the confirmation operation based on the location of the cursor displayed on the display panel 202, the processor 201 may specifically select, when at least one option (such as a menu) is displayed on the display panel 202, a target option at the location of the cursor from the at least one option; or may record the location of the cursor when the smart terminal device 200 enables a track model based input identification function.

According to the foregoing method, when an option is displayed on the display panel 202, the processor 201 may select the target option based on the location of the cursor, and further perform an operation corresponding to the target option. In this case, the user may adjust the location of the cursor by adjusting the location of the target object, thereby selecting the target option expected by the user.

According to the foregoing method, when the smart terminal device 200 enables the track model based input identification function, the processor 201 may generate a moving track of the cursor (or the target object) based on the recorded location of the cursor, and then may match the moving track with a preset track model, so as to identify content (an instruction or a character) of input implemented in this ultrasonic wave based action identification. In this case, the user may adjust the location of the cursor by adjusting the location of the target object, thereby entering the instruction or character expected by the user.

Step C: When determining, based on the second detection result, that the target object leaves the second space range from the second plane, the processor 201 stops performing the confirmation operation.

Optionally, the determining, by the processor 201 based on the second detection result, that the target object leaves the second space range from the second plane includes:

determining, by the processor 201, that the target object leaves the second space range from the second plane, when determining that the last e second detection results in the second detection result all indicate that the target object does not exist on the second plane and that f second detection results before the last e second detection results all indicate that the target object exists on the second plane, where e and f are both integers greater than or equal to 1.

Through this step, the user may adjust a height of the target object relative to the second plane when expecting the smart terminal device 200 to stop performing the confirmation operation.

Step D: When determining, based on the first detection result, that the target object leaves the first space range from the first plane, the processor 201 stops displaying the cursor. The processor 201 may determine that the target object leaves the first space range from the first plane, when determining that the last g second detection results in the first detection result all indicate that the target object does not exist on the first plane and that k second detection results before the last g second detection results all indicate that the target object exists on the second plane, where g and k are both integers greater than or equal to 1.

Through this step, the user may adjust a height of the target object relative to the first plane when expecting the smart terminal device 200 to stop displaying the cursor.

The smart terminal device 200 may further include a memory 206 configured to store a program instruction. Specifically, the program instruction may include program code, where the program code includes a computer operation instruction. The memory 206 may include a random access memory (RAM), and may further include a non-volatile memory, such as at least one magnetic disk memory. The processor 201 executes the program instruction stored in the memory 206, to implement the foregoing functions.

The embodiment of this application provides the smart terminal device, where the smart terminal device includes the first infrared sensor and the second infrared sensor that respectively detect whether the target object exists on the first plane and the second plane; after the processor in the smart terminal device determines, based on the first detection result of the first infrared sensor, that the target object enters or leaves the first space range from the first plane, the processor starts or stops displaying the cursor based on the distances measured by the ultrasonic sensors; and after the processor determines, based on the second detection result of the second infrared sensor, that the target object enters or leaves the second space range from the second plane, the processor starts or stops performing the confirmation operation based on the location of the cursor. The first plane and the second plane are the borders of the first space range and the second space range, respectively. The first plane is different from the second plane, and the second space range is contained in the first space range. According to the foregoing solution, the smart terminal device can determine, based on the detection result of the first infrared sensor, whether the user requires the cursor to be displayed, and determine, based on the detection result of the second infrared sensor, whether the user requires the confirmation operation to be performed. Certainly, the user can also adjust the location of the target object to implement an expected operation on the smart terminal device. Apparently, according to the solution, an effect of an ultrasonic wave based input action identification function of a smart terminal device can be improved, and user experience can be improved.

Figure 11:
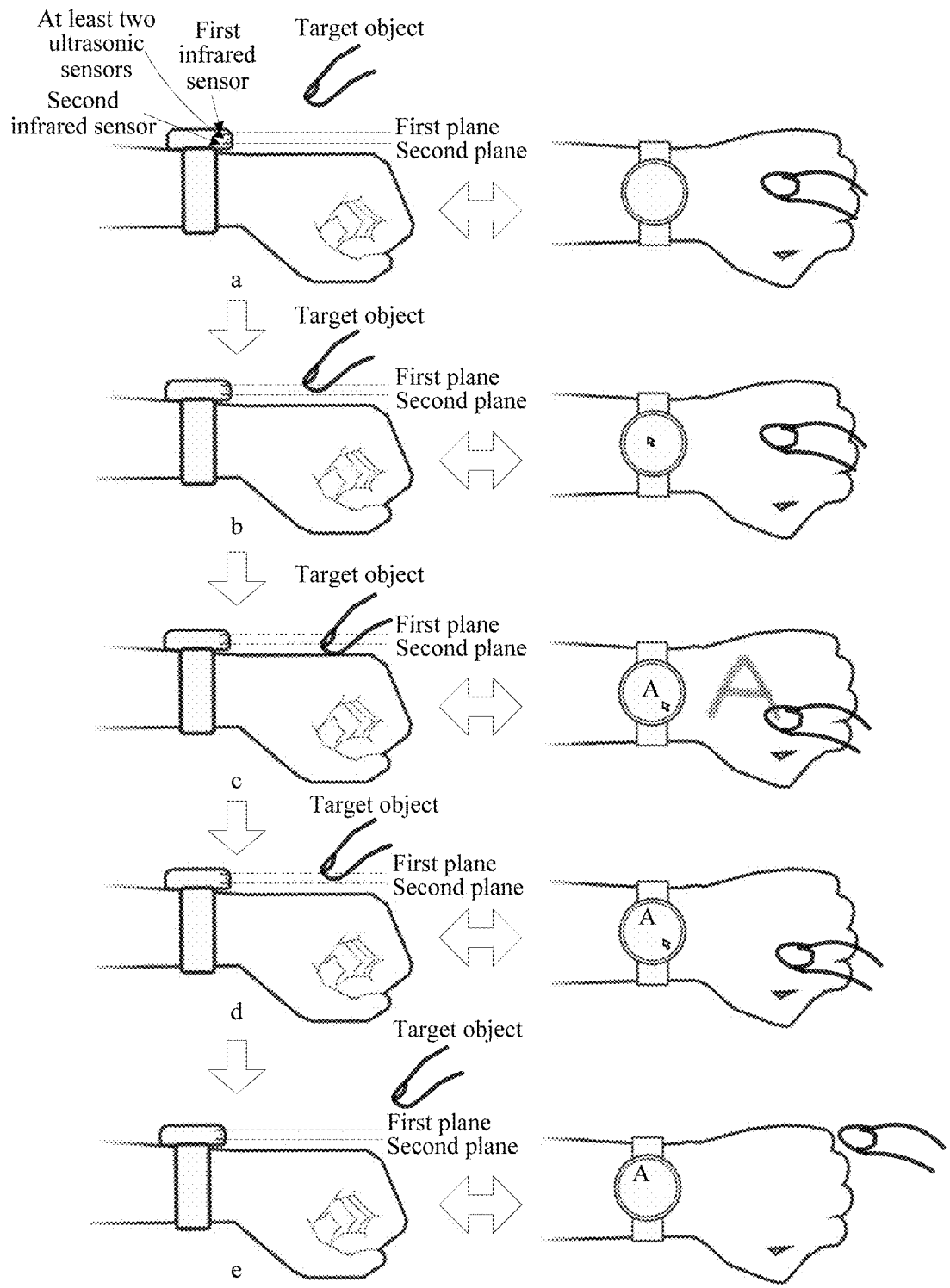
FIG. 11 is a schematic flowchart of ultrasonic wave based input action identification of a smartwatch according to an embodiment of this application.

The following uses a smartwatch as an example to describe a process in which a user controls a target object (such as a finger or a stylus) to implement ultrasonic wave based input action identification of the smartwatch, as shown in FIG. 11. The smartwatch enables a track model (such as an alphabetic model, a digital model, or a Chinese character model) based input identification function. In the figure, figures on the left are side views of location states of the finger and the smartwatch, and figures on the right are top views of the states.

As shown in the figure, a first infrared sensor of the smartwatch continuously detects whether the target object exists on a first plane, and generates a first detection result; the second infrared sensor continuously detects whether the target object exists on a second plane, and generates a second detection result; and the smartwatch further includes at least two ultrasonic sensors, where each ultrasonic sensor can measure a distance between the target object and the ultrasonic sensor in a measurement direction of the ultrasonic sensor. The first plane and the second plane are both parallel with a display plane of the smartwatch, as shown in the figure.

First, when the finger of the user does not reach the first plane, as shown by a side view of a state a in the figure, a processor in the smart terminal device may be in a sleep state and suspend an ultrasonic wave based input action identification function. At this moment, a display panel of the smartwatch does not display a cursor, as shown by a top view of the state a in the figure.

After the finger of the user moves downwards and reaches the first plane, as shown by a side view of a state b in the figure, the first infrared sensor may wake up the processor in an interruption manner when generating, for the first time, a first detection result indicating that the finger exists on the first plane, so that the processor enables the ultrasonic wave based input action identification function.

After enabling the ultrasonic wave based input action identification function, the processor obtains the first detection result and the second detection result. When determining, based on the first detection result, that the finger enters a first space range from the first plane, the processor determines a location of the cursor on the display panel of the smartwatch based on the distances measured by the at least two ultrasonic sensors, and controls the display panel to display the cursor at the location, as shown by a top view of the state b in the figure. Schematically, the figure uses an example in which the cursor is in a shape of an arrow. Two borders of the first space range are the first plane and hand skin of the user.

When the finger of the user continues to move downwards and reaches the second plane, as shown by a side view of a state c in the figure, the processor may determine, based on the second detection result, that the finger enters a second space range from the second plane. When the smartwatch enables the track model based input identification function, the processor records the location of the cursor on the display panel. Optionally, the processor may continuously display the location of the cursor on the display panel while recording the location of the cursor. In this way, when the finger moves, the display panel can display a moving track of the cursor, as shown by a top view of the state c in the figure. Two borders of the second space range are the second plane and the hand skin of the user, and the second space range is contained in the first space range.

When the user expects to stop input, the finger of the user moves upwards and leaves the second plane, as shown by a side view of a state d in the figure. At this moment, when determining, based on the second detection result, that the finger leaves the second space range from the second plane, the processor stops recording the location of the cursor on the display panel. Optionally, the processor may match the moving track of the cursor displayed on the display panel with a preset track model, so as to identify that content entered this time is a character "A". The processor may further display the character "A" on the display panel, as shown by a top view of the state d in the figure.

The finger of the user continues to move upwards and leaves the first plane, as shown by a side view of a state e in the figure. At this moment, when determining, based on the first detection result, that the finger leaves the first space range from the first plane, the processor stops displaying the cursor on the display panel, as shown by a top view of the state e in the figure.

Based on the foregoing embodiments, an embodiment of this application provides an input method, where the method may be applied to but is not limited to the smart terminal device shown in FIG. 1 or FIG. 2. The smart terminal device includes a display panel, at least two ultrasonic sensors, a first infrared sensor, a second infrared sensor, and a processor. The display panel is configured to display an interface. Any one of the at least two ultrasonic sensors is configured to measure a distance between a target object and the ultrasonic sensor. The first infrared sensor is configured to continuously detect whether the target object exists on a first plane, and generate a first detection result. The second infrared sensor is configured to continuously detect whether the target object exists on a second plane, and generate a second detection result. The first plane is different from the second plane.

Figure 12:
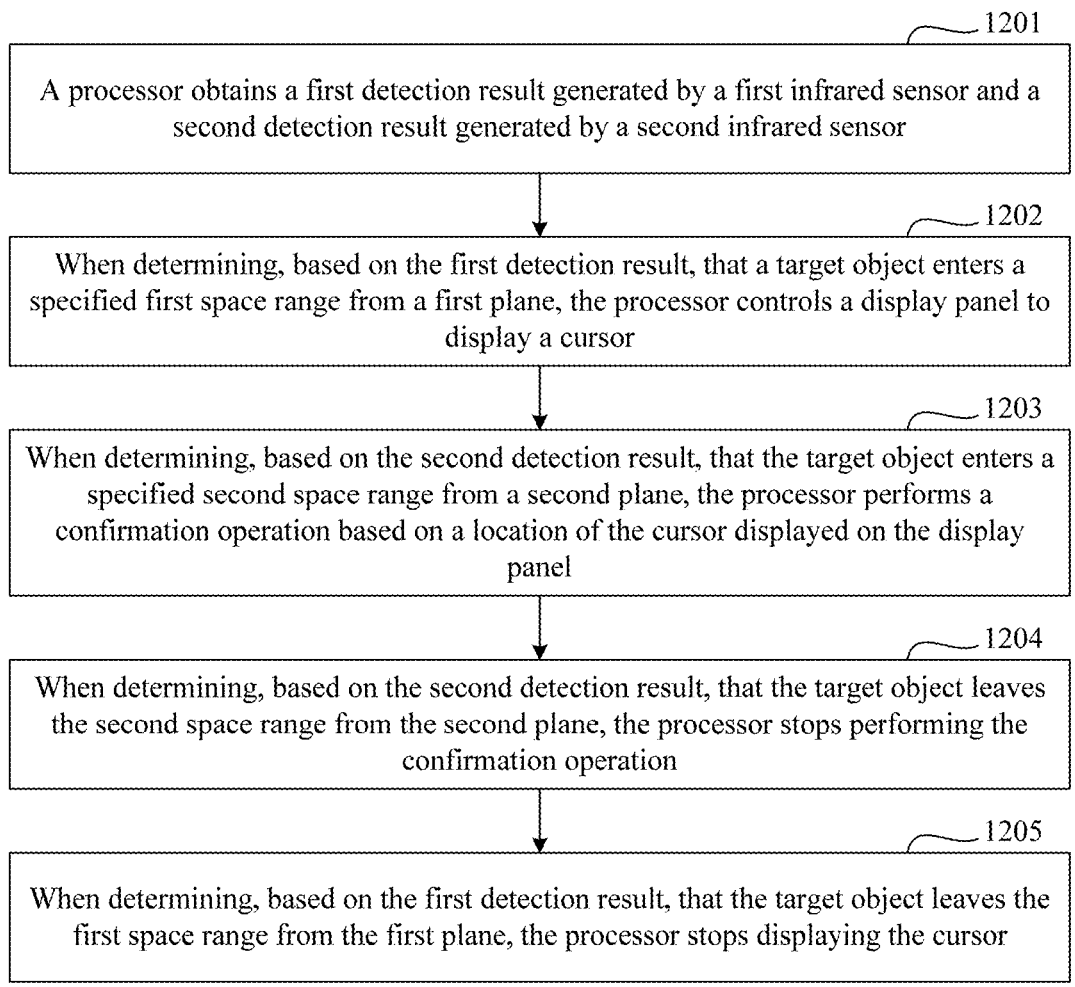
FIG. 12 is a flowchart of an input method according to an embodiment of this application.

Referring to FIG. 12, a process of the input method includes the following steps:

S1201: The processor obtains the first detection result generated by the first infrared sensor and the second detection result generated by the second infrared sensor.

S1202: When determining, based on the first detection result, that the target object enters a specified first space range from the first plane, the processor obtains a distance that is measured by each of the at least two ultrasonic sensors and that is between the target object and the ultrasonic sensor, determines a location of the cursor on the display panel based on the distances measured by the at least two ultrasonic sensors, and controls the display panel to display the cursor at the location, where the first plane is a border of the first space range.

S1203: When determining, based on the second detection result, that the target object enters a specified second space range from the second plane, the processor performs a confirmation operation based on the location of the cursor displayed on the display panel, where the second plane is a border of the second space range and the second space range is contained in the first space range.

S1204: When determining, based on the second detection result, that the target object leaves the second space range from the second plane, the processor stops performing the confirmation operation.

S1205: When determining, based on the first detection result, that the target object leaves the first space range from the first plane, the processor stops displaying the cursor.

Optionally, the determining, by the processor, a location of the cursor on the display panel based on the distances measured by the at least two ultrasonic sensors includes:

obtaining, by the processor, a distance that is measured by the first infrared sensor and that is between the target object and the first infrared sensor; and determining, by the processor, the location of the cursor on the display panel based on the distances measured by the at least two ultrasonic sensors and the distance measured by the first infrared sensor.

Optionally, the determining, by the processor, a location of the cursor on the display panel based on the distances measured by the at least two ultrasonic sensors includes:

obtaining, by the processor, a distance that is measured by the second infrared sensor and that is between the target object and the second infrared sensor; and determining, by the processor, the location of the cursor on the display panel based on the distances measured by the at least two ultrasonic sensors and the distance measured by the second infrared sensor.

Optionally, the performing, by the processor, a confirmation operation based on the location of the cursor displayed on the display panel includes:

when at least one option is displayed on the display panel, selecting, by the processor, a target option at the location of the cursor from the at least one option; or recording, by the processor, the location of the cursor when the smart terminal device enables a track model based input identification function.

An embodiment of this application provides the input method. According to the method, the smart terminal device can determine, based on the detection result of the first infrared sensor, whether a user requires the cursor to be displayed, and determine, based on the detection result of the second infrared sensor, whether the user requires the confirmation operation to be performed. Certainly, the user can also adjust a location of the target object to implement an expected operation on the smart terminal device. Apparently, according to the solution, an effect of an ultrasonic wave based input action identification function of a smart terminal device can be improved, and user experience can be improved.

Based on the foregoing embodiment, an embodiment of this application further provides a computer storage medium. The computer storage medium stores a computer program, and when the program is executed by a processor, the processor is configured to implement the input method in the embodiment shown in FIG. 12.

To sum up, some embodiments of this application provide the input method and the smart terminal device. In the solution, the smart terminal device includes the first infrared sensor and the second infrared sensor that respectively detect whether the target object exists on the first plane and the second plane; after the processor in the smart terminal device determines, based on the first detection result of the first infrared sensor, that the target object enters or leaves the first space range from the first plane, the processor starts or stops displaying the cursor based on the distances measured by the ultrasonic sensors; and after the processor determines, based on the second detection result of the second infrared sensor, that the target object enters or leaves the second space range from the second plane, the processor starts or stops performing the confirmation operation based on the location of the cursor. The first plane and the second plane are the borders of the first space range and the second space range, respectively. The first plane is different from the second plane, and the second space range is contained in the first space range. According to the foregoing solution, the smart terminal device can determine, based on the detection result of the first infrared sensor, whether the user requires the cursor to be displayed, and determine, based on the detection result of the second infrared sensor, whether the user requires the confirmation operation to be performed. Certainly, the user can also adjust the location of the target object to implement an expected operation on the smart terminal device. Apparently, according to the solution, an effect of an ultrasonic wave based input action identification function of a smart terminal device can be improved, and user experience can be improved.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of processes and/or blocks in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specified function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. In this way, the instructions executed on the computer or the another programmable device provide steps for implementing a specified function in one or more processes in the flowcharts and/or in one or more blocks in the block diagrams.

Apparently, a person skilled in the art can make various modifications and variations to the embodiments of this application without departing from the scope of the embodiments of this application. This application is intended to cover these modifications and variations provided that these modifications and variations of the embodiments of this application fall within the scope of the claims of this application and equivalent technologies thereof.

What is claimed is:

1. A smart terminal device, comprising a display panel, at least two ultrasonic sensors, a first infrared sensor, a second infrared sensor, and a processor, wherein
    each of the at least two ultrasonic sensors is configured to measure a distance between a target object and the each of the at least two ultrasonic sensors;
    the first infrared sensor is configured to continuously detect whether the target object exists on a first plane, and generate a first detection result;
    the second infrared sensor is configured to continuously detect whether the target object exists on a second plane, and generate a second detection result, wherein the first plane is different from the second plane;
    the processor is configured to:
    when determining, based on the first detection result, that the target object enters a first space range from the first plane, obtain the distance measured by the each of the at least two ultrasonic sensors, determine a location of a cursor on the display panel based on the distance measured by the each of the at least two ultrasonic sensors, and control the display panel to display the cursor at the location, wherein the first plane is a border of the first space range;
    when determining, based on the second detection result, that the target object enters a second space range from the second plane, perform a confirmation operation based on the location of the cursor displayed on the display panel, wherein the second plane is a border of the second space range and the second space range is contained in the first space range;
    when determining, based on the second detection result, that the target object leaves the second space range from the second plane, stop performing the confirmation operation; and
    when determining, based on the first detection result, that the target object leaves the first space range from the first plane, stop displaying the cursor, wherein
    the first infrared sensor is configured to:
    detect, by using infrared light of a first wavelength, whether the target object exists on the first plane; and
    the second infrared sensor is configured to:
    detect, by using infrared light of a second wavelength, whether the target object exists on the second plane, wherein the first wavelength is different from the second wavelength.

2. The smart terminal device according to claim 1, wherein when performing the confirmation operation based on the location of the cursor displayed on the display panel, the processor is configured to:

when at least one option is displayed on the display panel, select a target option at the location of the cursor from the at least one option; or record the location of the cursor when the smart terminal device enables a track model based input identification function.

3. A smart terminal device, comprising a display panel, at least two ultrasonic sensors, a first infrared sensor, a second infrared sensor, and a processor, wherein each of the at least two ultrasonic sensors is configured to measure a distance between a target object and the each of the at least two ultrasonic sensors;

the first infrared sensor is configured to continuously detect whether the target object exists on a first plane, and generate a first detection result;

the second infrared sensor is configured to continuously detect whether the target object exists on a second plane, and generate a second detection result, wherein the first plane is different from the second plane;

the processor is configured to:

when determining, based on the first detection result, that the target object enters a first space range from the first plane, obtain the distance measured by the each of the at least two ultrasonic sensors, determine a location of a cursor on the display panel based on the distance measured by the each of the at least two ultrasonic sensors, and control the display panel to display the cursor at the location, wherein the first plane is a border of the first space range;

when determining, based on the second detection result, that the target object enters a second space range from the second plane, perform a confirmation operation based on the location of the cursor displayed on the display panel, wherein the second plane is a border of the second space range and the second space range is contained in the first space range;

when determining, based on the second detection result, that the target object leaves the second space range from the second plane, stop performing the confirmation operation;

when determining, based on the first detection result, that the target object leaves the first space range from the first plane, stop displaying the cursor, wherein the first infrared sensor is further configured to measure a distance between the target object and the first infrared sensor; and when determining the location of the cursor on the display panel based on the distance measured by the each of the at least two ultrasonic sensors, the processor is configured to:

determine the location of the cursor on the display panel based on the distance measured by the each of the at least two ultrasonic sensors and the distance measured by the first infrared sensor.

4. A smart terminal device, comprising a display panel, at least two ultrasonic sensors, a first infrared sensor, a second infrared sensor, and a processor, wherein each of the at least two ultrasonic sensors is configured to measure a distance between a target object and the each of the at least two ultrasonic sensors;

the first infrared sensor is configured to continuously detect whether the target object exists on a first plane, and generate a first detection result;

the second infrared sensor is configured to continuously detect whether the target object exists on a second plane, and generate a second detection result, wherein the first plane is different from the second plane;

the processor is configured to:

when determining, based on the first detection result, that the target object enters a first space range from the first plane, obtain the distance measured by the each of the at least two ultrasonic sensors, determine a location of a cursor on the display panel based on the distance measured by the each of the at least two ultrasonic sensors, and control the display panel to display the cursor at the location, wherein the first plane is a border of the first space range;

when determining, based on the second detection result, that the target object enters a second space range from the second plane, perform a confirmation operation based on the location of the cursor displayed on the display panel, wherein the second plane is a border of the second space range and the second space range is contained in the first space range;

when determining, based on the second detection result, that the target object leaves the second space range from the second plane, stop performing the confirmation operation;

when determining, based on the first detection result, that the target object leaves the first space range from the first plane, stop displaying the cursor, wherein the second infrared sensor is further configured to measure a distance between the target object and the second infrared sensor; and when determining the location of the cursor on the display panel based on the distance measured by the each of the at least two ultrasonic sensors, the processor is configured to:

determine the location of the cursor on the display panel based on the distance measured by the each of the at least two ultrasonic sensors and the distance measured by the second infrared sensor.

5. An input method for a smart terminal device, the smart terminal device comprising a display panel, at least two ultrasonic sensors, a first infrared sensor, a second infrared sensor, and a processor, and the input method comprising:

obtaining, by the processor, a first detection result generated by the first infrared sensor and a second detection result generated by the second infrared sensor, wherein the first infrared sensor is configured to continuously detect whether a target object exists on a first plane, the second infrared sensor is configured to continuously detect whether the target object exists on a second plane, and the first plane is different from the second plane;

when determining, based on the first detection result, that the target object enters a first space range from the first plane, obtaining, by the processor, a distance that is measured by each of the at least two ultrasonic sensors and that is between the target object and the each of the at least two ultrasonic sensors, determining a location of a cursor on the display panel based on the distance measured by the each of the at least two ultrasonic sensors, and controlling the display panel to display the cursor at the location, wherein the first plane is a border of the first space range;

when determining, based on the second detection result, that the target object enters a second space range from the second plane, performing, by the processor, a confirmation operation based on the location of the cursor displayed on the display panel, wherein the second plane is a border of the second space range and the second space range is contained in the first space range;

when determining, based on the second detection result, that the target object leaves the second space range from the second plane, stopping, by the processor, performing the confirmation operation;

when determining, based on the first detection result, that the target object leaves the first space range from the first plane, stopping, by the processor, displaying the cursor, wherein the determining, by the processor, the location of the cursor on the display panel based on the distance measured by the each of the at least two ultrasonic sensors comprises:

obtaining, by the processor, a distance that is measured by the first infrared sensor and that is between the target object and the first infrared sensor; and determining, by the processor, the location of the cursor on the display panel based on the distance measured by the each of the at least two ultrasonic sensors and the distance measured by the first infrared sensor.

6. The method according to claim 5, wherein the performing, by the processor, the confirmation operation based on the location of the cursor displayed on the display panel comprises:

when at least one option is displayed on the display panel, selecting, by the processor, a target option at the location of the cursor from the at least one option; or recording, by the processor, the location of the cursor when the smart terminal device enables a track model based input identification function.

7. A non-transitory computer storage medium, wherein the computer storage medium stores a computer program, and when the program is executed by a processor, the processor is configured to implement the method according to claim 5.

8. An input method for a smart terminal device, the smart terminal device comprising a display panel, at least two ultrasonic sensors, a first infrared sensor, a second infrared sensor, and a processor, and the input method comprising:

obtaining, by the processor, a first detection result generated by the first infrared sensor and a second detection result generated by the second infrared sensor, wherein the first infrared sensor is configured to continuously detect whether a target object exists on a first plane, the second infrared sensor is configured to continuously detect whether the target object exists on a second plane, and the first plane is different from the second plane;

when determining, based on the first detection result, that the target object enters a first space range from the first plane, obtaining, by the processor, a distance that is measured by each of the at least two ultrasonic sensors and that is between the target object and the each of the at least two ultrasonic sensors, determining a location of a cursor on the display panel based on the distance measured by the each of the at least two ultrasonic sensors, and controlling the display panel to display the cursor at the location, wherein the first plane is a border of the first space range;

when determining, based on the second detection result, that the target object enters a second space range from the second plane, performing, by the processor, a confirmation operation based on the location of the cursor displayed on the display panel, wherein the second plane is a border of the second space range and the second space range is contained in the first space range;

when determining, based on the second detection result, that the target object leaves the second space range from the second plane, stopping, by the processor, performing the confirmation operation;

when determining, based on the first detection result, that the target object leaves the first space range from the first plane, stopping, by the processor, displaying the cursor, wherein the determining, by the processor, the location of the cursor on the display panel based on the distance measured by the each of the at least two ultrasonic sensors comprises:

obtaining, by the processor, a distance that is measured by the second infrared sensor and that is between the target object and the second infrared sensor; and determining, by the processor, the location of the cursor on the display panel based on the distance measured by the each of the at least two ultrasonic sensors and the distance measured by the second infrared sensor.

* * * * *